United States Patent
Wang et al.

(10) Patent No.: US 8,923,865 B2
(45) Date of Patent: Dec. 30, 2014

(54) APPARATUS AND METHOD OF INTER-RADIO ACCESS TECHNOLOGY MEASUREMENT SCHEDULING

(71) Applicant: QUALCOMM Incorporated, San Diego, CA (US)

(72) Inventors: Fan Wang, Sunnyvale, CA (US); An-swol C. Hu, Belmont, CA (US); Uzma Khan, San Marcos, CA (US); Sundaresan Tambaram Kailasam, San Diego, CA (US); Krishna Rao Mandadapu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 120 days.

(21) Appl. No.: 13/745,442

(22) Filed: Jan. 18, 2013

(65) Prior Publication Data

US 2013/0244657 A1    Sep. 19, 2013

Related U.S. Application Data

(60) Provisional application No. 61/611,433, filed on Mar. 15, 2012.

(51) Int. Cl.
| | |
|---|---|
| H04W 36/24 | (2009.01) |
| H04W 36/14 | (2009.01) |
| H04W 88/06 | (2009.01) |
| H04W 36/00 | (2009.01) |

(52) U.S. Cl.
CPC .............. *H04W 36/24* (2013.01); *H04W 36/14* (2013.01); *H04W 88/06* (2013.01); *H04W 36/0088* (2013.01)
USPC ...................................... 455/436; 455/522.1

(58) Field of Classification Search
CPC . H04W 36/0088; H04W 36/24; H04W 88/06; H04W 36/14; H04W 36/0083
USPC .............................. 455/70, 436, 552.1, 553.1
See application file for complete search history.

(56) References Cited

U.S. PATENT DOCUMENTS

| | | |
|---|---|---|
| 2008/0220784 A1 | 9/2008 | Somasundaram et al. |
| 2009/0181676 A1 | 7/2009 | Lee et al. |

(Continued)

FOREIGN PATENT DOCUMENTS

| | | |
|---|---|---|
| EP | 2088805 A1 | 8/2009 |
| GB | 2358550 A | 7/2001 |

(Continued)

OTHER PUBLICATIONS

International Search Report and Written Opinion—PCT/US2013/031431—ISA/EPO—Sep. 30, 2013.

*Primary Examiner* — Sam Bhattacharya
(74) *Attorney, Agent, or Firm* — Charles Chesney

(57) ABSTRACT

Apparatus and method for wireless communication in a wireless communication network includes operating a wireless device on a first wireless communication technology. Aspects also include detecting a cell of a second wireless communication technology and determining the detected cell of the second wireless communication technology satisfies a first reselection criterion based on a first measurement. Still further the aspects includes expediting a determination of whether to perform cell reselection to the second wireless communication technology based on the detected cell of the second wireless communication technology satisfying the first reselection criterion. Additionally, aspects include determining to reselect to the detected cell of the second wireless communication technology when the at least one new measurement satisfies a second reselection criterion for the reselection time period.

34 Claims, 15 Drawing Sheets

(56) References Cited

U.S. PATENT DOCUMENTS

2011/0269449 A1* 11/2011 Kazmi et al. ............... 455/422.1
2012/0052864 A1   3/2012 Swaminathan et al.
2012/0083276 A1   4/2012 Roberts et al.
2012/0195290 A1   8/2012 Bienas et al.

FOREIGN PATENT DOCUMENTS

| | | |
|---|---|---|
| GB | 2485854 A | 5/2012 |
| WO | WO-2008050230 A2 | 5/2008 |
| WO | WO-2010077192 A1 | 7/2010 |

* cited by examiner

APPARATUS AND METHOD OF INTER-RADIO ACCESS TECHNOLOGY MEASUREMENT SCHEDULING

CLAIM OF PRIORITY UNDER 35 U.S.C §119

The present application for patent claims priority to U.S. Provisional Application No. 61/611,433 entitled "APPARATUS AND METHOD OF INTER-RADIO ACCESS TECHNOLOGY MEASUREMENT SCHEDULING" filed Mar. 15, 2012, and assigned to the assignee hereof and hereby expressly incorporated by reference.

BACKGROUND

1. Field

Aspects of the present disclosure relate generally to wireless communication systems, and more particularly, to methods and apparatus of monitoring radio channels.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Another, more advanced network is the evolved UMTS Terrestrial Radio Access Network, also referred to as the Long Term Evolution (LTE) network. As LTE network deployments largely overlaps with W-CDMA deployments, when a suitable LTE cell becomes available, typically it is preferable for a user equipment (UE) operating on a W-CDMA cell to reselect to the LTE cell as soon as the reselection conditions are met. Current cell reselection mechanisms, however, may be relatively slow in performing the reselection to the LTE cell. This may be especially true when the reselection conditions include maintaining a reselection criterion for a certain time period.

Therefore, improved cell reselection mechanisms are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of improving cell reselection is offered. The method includes operating a wireless device on a first wireless communication technology. Further, the method includes detecting a cell of a second wireless communication technology, wherein the second wireless communication technology is preferred relative to the first wireless communication technology. Additionally, the method includes determining the detected cell of the second wireless communication technology satisfies a first reselection criterion based on a first measurement. Still further the method includes expediting a determination of whether to perform cell reselection to the second wireless communication technology based on the detected cell of the second wireless communication technology satisfying the first reselection criterion, wherein the expediting the determination of whether to perform cell reselection comprises increasing a frequency of measuring the detected cell so that at least one new measurement occurs prior to an expiration of a reselection time period. The method also includes determining to reselect to the detected cell of the second wireless communication technology when the at least one new measurement satisfies a second reselection criterion for the reselection time period.

In another aspect, an apparatus of improving cell reselection includes a processor configured to operate a wireless device on a first wireless communication technology. Further, the processor is configured to detect a cell of a second wireless communication technology, wherein the second wireless communication technology is preferred relative to the first wireless communication technology. Additionally, the processor is configured to determine the detected cell of the second wireless communication technology satisfies a first reselection criterion based on a first measurement. Still further, the processor is configured to expedite a determination of whether to perform cell reselection to the second wireless communication technology based on the detected cell of the second wireless communication technology satisfying the first reselection criterion, wherein the at least one processor configured to expedite the determination of whether to perform cell reselection is further configured to increase a frequency of measuring the detected cell so that at least one new measurement occurs prior to an expiration of a reselection time period. The processor is also configured to determine to reselect to the detected cell of the second wireless communication technology when the at least one new measurement satisfies a second reselection criterion for the reselection time period.

In another aspect, an apparatus for improving cell reselection is offered that includes means for operating a wireless device on a first wireless communication technology. Further, the apparatus includes means for detecting a cell of a second wireless communication technology, wherein the second wireless communication technology is preferred relative to the first wireless communication technology. Additionally, the apparatus includes means for determining the detected cell of the second wireless communication technology satisfies a first reselection criterion based on a first measurement. Still further, the apparatus includes means for expediting a determination of whether to perform cell reselection to the second wireless communication technology based on the detected cell of the second wireless communication technology satisfying the first reselection criterion, wherein the means for expediting the determination of whether to perform cell reselection comprises means for increasing a frequency of measuring the detected cell so that at least one new measurement occurs prior to an expiration of a reselection time period. The apparatus also includes means for determining to reselect to the detected cell of the second wireless communication technology when the at least one new measurement satisfies a second reselection criterion for the reselection time period.

In addition, a computer readable media of improving cell reselection is offered that may include machine-executable code for operating a wireless device on a first wireless communication technology. Further, the code may be executable for detecting a cell of a second wireless communication technology, wherein the second wireless communication technology is preferred relative to the first wireless communication technology. Additionally, the code may be executable for determining the detected cell of the second wireless communication technology satisfies a first reselection criterion based on a first measurement. Still further, the code may be executable for expediting a determination of whether to perform cell reselection to the second wireless communication technology based on the detected cell of the second wireless communication technology satisfying the first reselection criterion, wherein the code for expediting the determination of whether to perform cell reselection comprises code for increasing a frequency of measuring the detected cell so that at least one new measurement occurs prior to an expiration of a reselection time period. The code may also be executable for determining to reselect to the detected cell of the second wireless communication technology when the at least one new measurement satisfies a second reselection criterion for the reselection time period.

Figure 1:
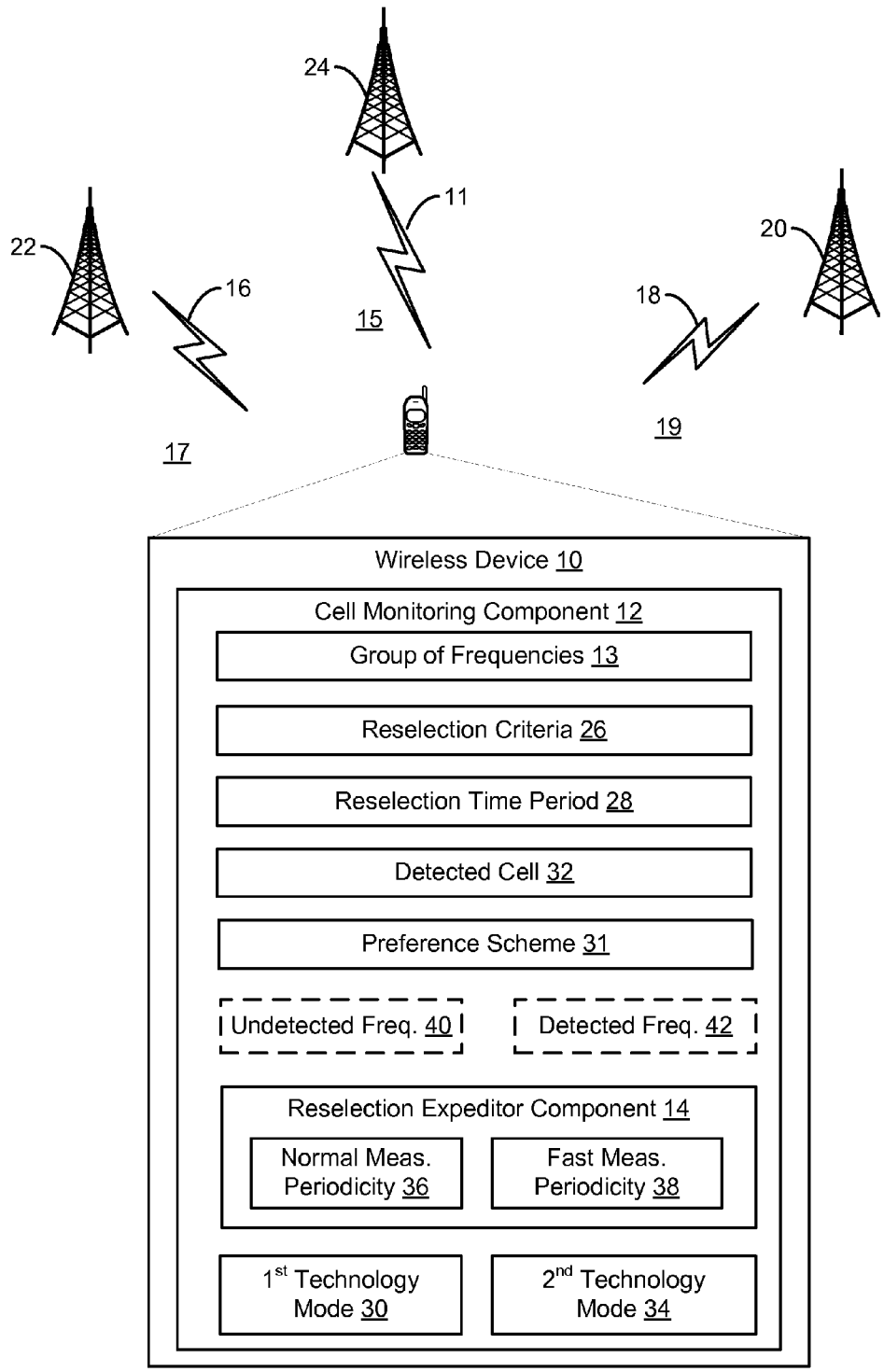
FIG. 1 is schematic diagram of an aspect of a wireless device for monitoring radio channels.

It should be noted that a component in any figure represented within dashed lines may be an optional component.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The described apparatus and methods improve a cell reselection procedure by considering monitored frequencies as a group. For example, upon camping on a cell, a user equipment (UE) may receive a list of frequencies to be monitored for reselection purposes. As such, during the monitoring for and measuring of signals in the list of frequencies in the group, the UE decides whether a reselection criterion has been satisfied for any cell in all frequencies in the group.

In an aspect, if the reselection criterion has been satisfied for at least one cell in at least one frequency of the group, then according to the present apparatus and methods the UE will use a fast measurement periodicity, e.g. a periodicity shorter than a normal measurement periodicity, to schedule the next measurement for the group.

In another aspect, if the reselection criterion has been satisfied for at least one cell in at least one frequency of the group, then according to the present apparatus and methods the UE will identify if any frequency in the group is an undetected frequency when a cell is not detected on the frequency. In this case, then the UE will use a fast measurement periodicity that is based on the number of detected frequencies in the group (e.g., the number in the group of frequencies minus the number of undetected frequencies) to schedule the next measurement for the group. It should be noted that in this aspect, the fast measurement periodicity equally may be based on the number of undetected frequencies relative to the number of frequencies in the group.

In a further aspect, the two above-noted aspects may be combined such that the fast measurement periodicity is shorter than the normal measurement periodicity based on a first factor corresponding to the reselection criterion being satisfied for at least one cell in at least one frequency of the group, and additionally based on a second factor corresponding to the number of detected frequencies in the group (or, e.g., a ratio of the number of undetected frequencies relative to the number of frequencies in the group).

Additionally, in a further aspect, the present apparatus and methods configure a value for the fast measurement periodicity that enables a cell reselection to occur as soon as a reselection time period is met for a cell that satisfies the reselection criterion. The reselection time period is a time period over which the reselection criterion need to be satisfied, e.g. where measurements of characteristics of signals from a cell meet the reselection criteria, in order for the UE to reselect to the cell. For example, in some cases, the UE needs to ensure that the measurement of the new cell (e.g., the candidate for reselection) is achieves one or more thresholds and/or is better ranked than the serving cell at least during a time interval, e.g. the reselection time period. In contrast to prior art solutions where measurements are not expedited, the present apparatus and methods thereby allow a UE to perform cell reselection faster, e.g. upon expiration of the reselection time period.

Thus, the present apparatus and methods speed-up a cell reselection determination, thereby allowing the UE to more quickly reselect from one cell to another cell. Accordingly, the present apparatus and methods may be especially useful when one technology type network is preferred over another technology type network. For example, the present apparatus and methods may be useful in order to expedite a cell reselection from a WCDMA technology cell to an LTE technology cell, as when a suitable LTE cells becomes available, it may be preferable for a UE to reselect to LTE cell as soon as the reselection conditions are met.

FIG. 1 illustrates a representation of wireless device 10, also referred to herein as a user equipment (UE), having improved cell reselection performance. As illustrated, the wireless device 10 of FIG. 1 includes a cell monitoring component 12 configured to manage frequency searches to detect cells to consider for reselection. In the representation of FIG. 1, cell monitoring component 12 is illustrated as storing a plurality of values including, as shown, information regarding a group of frequencies 13, information regarding one or more reselection criteria 26, information regarding a detected cell 32, information regarding one or more undetected frequencies 40, information regarding a detected frequency 42, information regarding a first technology mode 30 and information regarding a second technology mode 34. Each of these values will be discussed in more detail below. Cell monitoring component 12, as shown, also includes a reselection expeditor component 14 configured to speed-up a determination as to whether cell reselection should be performed.

Cell monitoring component 12 may, for example, perform a cell measurement and monitoring procedure, such as a cell reselection procedure, to identify cell reselection candidates based on signal measurements (e.g., power). It should be noted that measuring a detected cell may comprise measuring signals on a frequency associated with the cell and may also comprise measuring signals on one or more frequencies of the group of frequencies 13 to identify cells for reselection. In some implementations, cell monitoring component 12 may perform a WCDMA to LTE cell reselection procedure, although reselections between other radio access technologies and within a given radio access technology are also contemplated by the present aspects. As noted above, cell monitoring component may store information regarding a group of frequencies 13. This stored information, may include, for example, the carrier frequency for each frequency in the group of frequencies 13 used by cells of a particular radio access technology (e.g., the second wireless technology). In operation, cell monitoring component 12 initiates periodic monitoring of the group of frequencies 13 to identify cells for reselection. This may include, for example, measuring characteristics (e.g., power) of any detected signals, such as signals 16 and 18, on any of the frequencies in the group of frequencies 13.

In an exemplary aspect, the group of frequencies 13 may be provided to wireless device 10 by the network, such as in a system information broadcast message, e.g. a SIB19 message, received from serving base station 24 via signal 11. Signals 16 and 18 may be, for example, pilot signals broadcast by neighbor base stations 20 and 22 adjacent to serving base station 24, which supports a serving cell 15 where wireless device 10 is currently camped (also referred to herein as "connected"). Signals 16 and 18 respectively advertise cells 17 and 19 supported by the respective base stations 20 and 22.

In one example, serving cell 15 may operate on or otherwise communicate according to a first wireless communication technology, such as WCDMA, and cells 17 and 19 may operate on or otherwise communicate according to a second wireless communication technology, such as LTE. As such, the periodic monitoring and measuring of signals may include, but are not limited to, inter-radio access technology measurements.

Further, for example, the cell measurement and monitoring procedure performed by cell monitoring component 12 allows wireless device 10 to determine, among other things, a signal power such as a received signal code power (RSCP) and/or a ratio of received energy per chip to a received overall energy (Ec/Io) at the current instant, which can be used in determining to reselect a new cell. For example, wireless device 10 may reselect and camp on or connect to a new cell when a power level of the new cell, such as one of cells 17 or 19, meets a cell reselection criteria 26 relative to a power level of serving cell 15 for a cell reselection time period 28. In other words, cell reselection criteria 26 may include one or more thresholds, such as a power level threshold that should be achieved and maintained for cell reselection time period 28. As noted above, the cell reselection criteria 26 and cell reselection time period 28 may be stored by cell monitoring component 12.

Wireless device 10 may operate in discontinuous reception (DRX) to improve its stand-by time. It should be noted that idle mode procedures may be specified in, for example, 3GPP TS 25.304, "User Equipment (UE) procedures in idle mode and procedures for cells reselection in connected mode," 3GPP TS 25.133, "Requirements for support of radio resource management (FDD)," and 3GPP TS 25.123, "Requirements for Support of Radio Resource Management (TDD)," hereby incorporated by reference herein. Moreover, additional procedures, such as handover and inter-RAT procedures may be specified in, for example, 3GPP TS 25.331, "Radio Resource Control (RRC); Protocol specification." In an aspect, at the beginning of each DRX cycle, wireless device 10 wakes up, re-acquires the camping cell, measures the Common Pilot Indicator CHannel (CPICH) Ec/Io and/or CPICH RSCP level of the camping cell and evaluates cell measurement criterion, which may be defined by the network and/or by a wireless communication specification, e.g. an "S" or selection threshold. Depending on a value of the measured CPICH Echo and/or CPICH RSCP level of the camping cell relative to the cell measurement criterion, wireless device 10 (e.g., cell monitory component 12) may trigger measurements of the group of frequencies 13 and evaluate detected cells relative to cell reselection criterion 26 and reselection time period 28 stored by cell monitoring component 12.

According to the described aspects, cell monitoring component 12 may execute reselection expeditor component 14 to enable wireless device 10 to speed-up the searching and measuring of frequencies for making a cell reselection determination. Reselection expeditor component 14 may store, for example, a normal measurement periodicity 36 and a fast measurement periodicity 38, wherein the fast measurement periodicity 38 has a smaller value relative to the normal measurement periodicity 36. As such, the wireless device 10 operating according to the fast measurement periodicity 38 makes more measurements in a same amount of time as compared to operation according to the normal measurement periodicity 36. The normal measurement periodicity 36 may specify the periodicity that is used by the wireless device 10 in performing measurements of the frequencies in the group of frequencies 13 during normal operations. The fast measurement periodicity 38 may specify the periodicity that is used by the wireless device 10 in performing measurements of the frequencies in the group of frequencies when the reselection expeditor component 14 decides to expedite measurements.

Additionally, wireless device 10 may store procedures for operation according to a first technology mode 30 and a second technology mode 34. In an aspect, for example, the first technology mode 30 may correspond to the wireless communications technology of the base station 24 to which the wireless device 10 is camped on (e.g., WCDMA), while the second wireless technology mode 34 may correspond to the second wireless communication technology (e.g., LTE) that the wireless device 10 may be able to select based upon the reselection determination.

As such, in an aspect of the present apparatus and methods, when wireless device 10 is operating in first wireless communication technology mode 30, cell monitoring component 12 may initiate monitoring the group of frequencies 13, which may include frequencies corresponding to a different, a second wireless communication technology. As a result of the monitoring, cell monitoring component 12 may detect a cell of the second wireless communication technology, e.g. one of cells 17 or 19 referred to as detected cell 32, and store information regarding the detected cell 32. For example, the stored information may include characteristics of the measured signal from detected cell 32, where the characteristics may include, for example, a received power level. Further, cell monitoring component 12 may determine that the detected cell 32 of the second wireless communication technology satisfies reselection criteria 26, such as a first reselection criterion (e.g. a power level threshold) based on a first measurement. Moreover, cell monitoring component 12 may determine that the second wireless communication technology associated with detected cell 32 may be preferred relative to the first wireless communication technology of serving cell 15, such as when the second wireless communication technology provides an improved quality of service or other improved or different characteristic relative to the first wireless communication technology.

For example, the cell monitoring component 12 may prefer a second wireless communication technology over the first communication technology based on a technology preference scheme 31 or list, which can be manually set by a user or obtained by the UE from an network operator or during manufacture of the UE. For example, but not limited hereto, preference scheme 31 may include a prioritized or ordered list of wireless communication technology identifiers, wherein an ordering in the list corresponds to a preference of one technology relative to another technology. In another aspect, for example, preference scheme 31 may include wireless communication technology identifiers and corresponding preference values, where a relative value of each preference value indicates a relative preference. The cell monitoring component 12 may be triggered to a choose the second wireless technology as preferred over the first wireless technology when a preference order or value of the second wireless technology relative to the first wireless technology based on the preference scheme 31 is determined to be to be the superior preference order or value. As such, wireless device 10 may be configured with preference scheme 31 that triggers expediting an evaluation of whether to reselect to detected cell 32 of the second wireless communication technology in order to operate in a corresponding second wireless communication technology mode 34.

Moreover, cell monitoring component 12 may also be configured to execute reselection expeditor component 14, which may include a specially-programmed algorithm to expedite a determination of whether to perform cell reselection to the second wireless communication technology based on detecting the cell of the second wireless communication technology, e.g. detected cell 32. In other words, reselection expeditor component 14 may expedite a determination of whether to perform cell reselection to detected cell 32 of the second wireless communication technology based on the detected cell 32 satisfying reselection criteria 26, which may include a first reselection criterion such as a first threshold (e.g., a received power threshold) associated with a first measurement of the signal of detected cell 32, wherein expediting the determination of whether to perform cell reselection comprises increasing a frequency of measuring the signal of the detected cell 32 so that at least one new measurement occurs prior to an expiration of reselection time period 28.

For example, reselection expeditor component 14 is configured to expedite the determination of whether to perform cell reselection in order to allow wireless device 10 to reselect to the second technology network as soon as possible according to the reselection specifications or standards. In other words, reselection expeditor component 14 insures that wireless device 10 performs a cell reselection in a minimum allowable time period in order to more quickly establish communications with a preferred communication technology type, e.g. so that wireless device 10 can achieve a desired quality of service or achieve an increased throughput, etc., when a connection is desired.

Additionally, reselection expeditor component 14 is configured to determine whether detected cell 32 of the second wireless communication technology satisfies reselection criterion 26 for triggering the cell reselection based on expediting measurements for the group of frequencies 13 associated with detected cell 32. For instance, the wireless device 10 may receive a signal on one of the group of frequencies 13 associated with the detected cell 32 that has a received signal code power (RSCP) and/or a ratio of received energy per chip to a received overall energy (Ec/Io) at the current instant that meets reselection criterion 26, such as a measured signal power threshold. If the reselection expeditor component 14 determines that cell meets the reselection criteria (e.g., the signal from the cell exceeds the signal power threshold), the reselection expeditor component 14 determines that the detected cell 32 is a cell reselection candidate.

Alternatively, or in addition, reselection criterion 26 may further include or be associated with additional conditions, such as reselection time period 28, which is an amount of time during which a measured Ec/Io and/or RSCP level is to be maintained, and/or other conditions such as the Ec/Io threshold and/or RSCP threshold including a hysteresis parameter that biases toward the current camped on cell to avoid a cell reselection ping-pong effect. In other words, determining that the detected cell satisfies the first reselection criterion comprises determining the first measurement meets a first threshold and determining to reselect when the at least one new measurement satisfies the second reselection criterion for the reselection time period further comprises determining the at least one new measurement meets a second threshold.

Additionally, reselection expeditor component 14 may be configured to trigger cell monitoring component 12 to increase a frequency of measuring detected cell 32 so that at least one new measurement occurs prior to an expiration of reselection time period 28, which may be an additional threshold associated with reselection criterion 26. For example, reselection expeditor component 14 may be configured to identify a group of frequencies of the second wireless communication technology to be searched for the cell reselection, such as group of frequencies 13, corresponding to detected cell 32, e.g. where detected cell 32 is detected on one of group of frequencies 13. Based on the association between detected cell 32 and group of frequencies 13, reselection expeditor component 14 may be configured to trigger cell monitoring component 12 to increase a frequency of measuring (e.g. reduce the measurement interval) for each the group of frequencies 13.

In some aspects, based on presence of detected cell 32 and/or based on detected cell 32 satisfying reselection criterion 26, reselection expeditor component 14 may be configured to trigger a switch from a normal measurement periodicity 36 to a fast measurement periodicity 38 to reduce a measurement periodicity, e.g. to reduce the interval between measurements, of detected cell 32 and/or group of frequencies 13 of the second wireless communication technology. In other cases, measurements according to fast measurement periodicity 38 may occur at least twice as fast as measurements according to normal measurement periodicity 36, although any reduced value of periodicity that results in reduced intervals between measurements may be utilized as fast measurement periodicity 38. As mentioned above, the value of fast measurement periodicity 38, e.g. the interval between measurements, may be configured to insure that at least one new measurement of detected cell 32, or any other detected cells that are candidates for reselection, occurs prior to an expiration of reselection time period 28 in order to enable wireless device 10 to reselect to a new cell as quickly as possible within the specification or operator-defined guidelines.

As such, reselection expeditor component 14 may be configured to condition the expediting of the determination of whether to perform cell reselection on detected cell 32 satisfying reselection criterion 26. Also, similar to the above-mentioned aspect, reselection expeditor component 14 may increase a measurement rate for measuring the frequencies of the group of frequencies 13 (e.g., in attempting to detect a cell of the second wireless communication technology). Reselection expeditor component 14 may increase this measurement rate by, for example, switching from a normal measurement periodicity 36 to a fast measurement periodicity 38. It should be understood, however, that in alternative implementations the increase in measurement rate may use other parameter values besides stored fast measurement periodicity 38. For example, in certain implementation the wireless device 10 may use different fast periodicity when an undetected frequency 40 is identified, as compared to when detected cell 32 is present and/or when detected cell 32 satisfies reselection criterion 26.

Moreover, in one case according to this aspect that should not be construed as limiting, the increased frequency of measuring (e.g. fast measurement periodicity 38) may be a function of a number of detected frequencies 42, e.g. such as a count of the frequencies of the group of frequencies 13 on which a cell is detected, such as detected cell 32 on a first frequency. Correspondingly, normal measurement periodicity 36 may be a function of the total number of frequencies in the group of frequencies 13. Alternatively, for example, in one case according to this aspect that should not be construed as limiting, the increased frequency of measuring (e.g. reduced measurement interval) and/or fast measurement periodicity 38 may be a function of a ratio of a number of undetected frequencies 40 to a number of frequencies in the group of frequencies 13.

Moreover, a combined aspect may include a combination of the two above-noted aspects, such that the increased frequency of measuring (e.g. reduced measurement interval) and/or fast measurement periodicity 38 is more frequent than a normal frequency of measurement and/or normal measurement periodicity 36 based on a first factor corresponding to reselection criterion 26 being satisfied for at least one cell in at least one frequency of the group of frequencies 13, and additionally based on a second factor corresponding to a number of detected frequencies 42 in the group of frequencies 13 (or, e.g., a ratio of a number of undetected frequencies 40 relative to a number of frequencies in the group of frequencies 13).

As a result of the execution of reselection expeditor component 14, a measurement procedure or algorithm of cell monitoring component 12 may be modified to measure detected cell 32 or group of frequencies 13 of the second wireless communication technology according to a reduced measurement periodicity. Further, cell monitoring component 12 is configured to determine that the measurement of detected cell 32 (or some other cell that is a candidate for reselection) of the second wireless communication technology during the reduced measurement periodicity satisfies reselection criterion 26 for reselection time period 28. Accordingly, cell monitoring component 12 is configured to generate a determination that conditions for cell reselection are achieved, and in response initiate a cell reselection to reselect from the first wireless communication technology to detected cell 32 of the second wireless communication technology after expiration of reselection time period 28.

Consequently, reselection expeditor component 14 may be configured to reselect from the first wireless communication technology to the detected cell 32 of the second wireless communication technology after expiration of the reselection time period 28 and thereby can be configured to operate the wireless device 10 on the second wireless communication technology. In other words, the call monitoring component 12 determines to reselect to the detected cell of the second wireless communication technology when at least one new measurement associated with the expedited measurement satisfies a threshold, such as a received power level threshold, which may also be referred to as a second reselection criterion even though it may be the same received power level threshold associated with the first measurement of detected cell 32, for the reselection time period 28.

In an alternative or additional aspect, cell monitoring component 12 may store a plurality of frequencies in the group of frequencies 13. Cell monitoring component 12 may then attempt to detect a signal on the first frequency of the group of frequencies 13. For explanatory purposes, this first frequency will be referred to as F1. Then after a period of time has expired, referred to herein as a search period, cell monitoring component may then attempt to detect a signal on a second frequency from the group of frequencies 13. For explanatory purposes, this second frequency is referred to herein as F2. Cell monitoring component 12 then waits the search period and then attempts to detect a signal on the next frequency in the group of frequencies 13. This process then repeats until the cell monitoring component 12 attempts to detect signals on all frequencies in the group 13; after which, the cell monitoring component 12 starts over at the F1 frequency and repeats the process. For ease of explanation, in the present description, it will be assumed that the group of frequencies 13 includes at least two frequencies (F1 and F2).

Thus, the cell monitoring component 12 alternates between attempting to detect signals on the F1 frequency and the F2 frequency over the search period. If during any attempt to detect a signal is not detected, the cell monitoring component 12 identifies the frequency (e.g., F1 or F2) as an undetected frequency and stores information identifying that the frequency was undetected (illustrated in FIG. 1 as undetected frequency 40).

In addition to attempting to detect the presence of signals on frequencies in the group of frequencies 13, cell monitoring component 12 may also take measurements of these signals in the group of frequencies 13. As discussed above, the rate at which the cell monitoring component 12 attempts to detect the presence of signals on the frequencies is referred to as the search rate or search periodicity. The rate at which the cell monitoring component 12 takes measurements of signals on these frequencies is referred to as the measurement rate of measurement periodicity. The search rate may be different than the measurement rate. For example, in an embodiment, the measurement rate may be faster than the search rate. In one such example, during normal operations, the measurement rate may be twice that of the search rate; and when the cell monitoring component 12 determines to expedite the determination, the measurement rate may be, for example, four times that of the search rate, which may remain constant.

In the event cell monitoring component 12 determines that a particular frequency is undetected, cell monitoring component 12 may provide this information to reselection expeditor component 14 for use in determining the rate at which to take measurements on the frequencies of the group 13 as well, as for example which frequencies to take measurements on. For example, in an embodiment, if during the search, a particular frequency is determined to be an undetected frequency 40, cell monitoring component 12 may determine not to take measurements on the undetected frequency 40. Additionally, in an example, cell monitoring component 12 may identify a number of undetected frequencies 40, and reselection expeditor component 14 may dynamically adjusted the rate of the fast measurement periodicity when undetected frequencies 40 are detected and the specific rate is proportional to the number of detected undetected frequencies 40. In addition to cell monitoring component 12 storing that a frequency is undetected 40, cell monitoring component 12 may also store that a frequency is detected 42 during the search.

Thus, the present apparatus and methods includes a wireless device 10 having a cell monitoring component 12 and reselection expeditor component 14 that speed up a determination of whether a cell reselection should be performed, for example based on a grouping of frequencies corresponding to detected cell that meets a reselection criterion and/or based on a number of detected cells/frequencies (or a ratio of undetected cells/frequencies to a number of the group of frequencies), thereby resulting in improved reselection performance for wireless device 10.

It should be noted the components of wireless device 10 of FIG. 1 may be implemented, for example, by hardware components specifically configured to carry out the stated processes/algorithm, implemented by a processor configured to perform the stated processes/algorithm, stored within a computer-readable medium for implementation by a processor, or some combination thereof will be discussed in more detail with regards to FIGS. 12-13.

Figure 2:
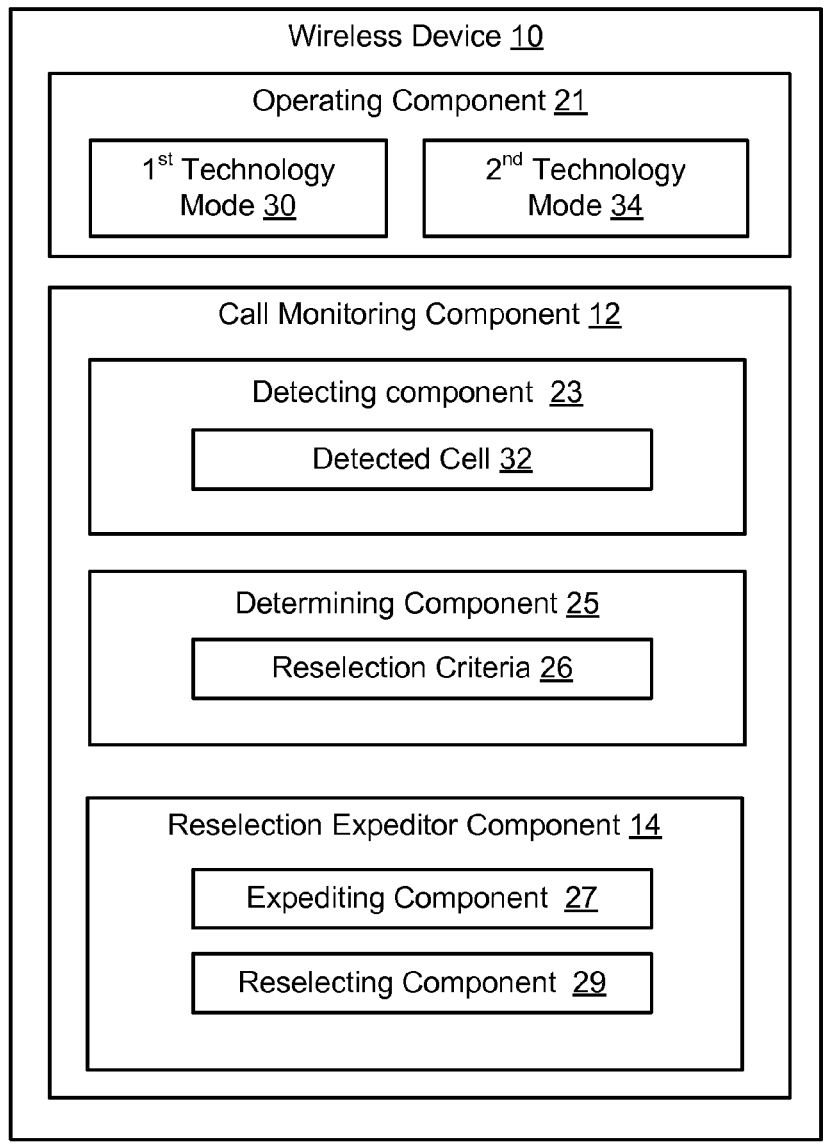
FIG. 2 is another schematic diagram of an aspect of a wireless device for monitoring radio channels.

FIG. 2 provides a functional block diagram of additional and/or more detailed aspects of wireless device 10 of FIG. 1. In an aspect, wireless device 10 may further include an operating component 21 capable of operating wireless device 10 in first technology mode 30 on a first wireless communication technology (e.g., WCDMA) or in second technology mode 34 on second wireless communication technology (e.g., LTE). It should be noted that, for ease of explanation, the first wireless technology is described as WCDMA and the second wireless technology as LTE; however, it should be understood that in other implementations, the reselection may occur between other wireless communications technologies, such as, HSPA, EV-DO, etc.

Cell monitoring component 12 is further illustrated as including a detecting component 23 capable of detecting a cell, such as detected cell 32, of a second wireless communication technology (e.g. LTE). For example, detecting component 23 identifies when wireless device 10 receives a signal that is associated with second wireless technology, such as based on monitoring of a frequency associated with a pilot or carrier frequency of a cell of the second communication technology.

Cell monitoring component 12 may also include a determining component 25 configured for determining the detected cell of the second wireless communication technology satisfies a first reselection criterion, such as reselection criteria 26, based on a first measurement. For example, determining component 25 may receive a measured characteristic (e.g., received power level) of the signal of the detected cell 32 of the second wireless communication technology and compare it to reselection criteria 26, which may include a first threshold value (e.g., received power threshold).

Still further, the cell monitoring component 12 may include a reselection expeditor component 14 to enable wireless device 10 to speed-up the searching and measuring of frequencies for making a cell reselection determination. The reselection expeditor component 14 may include an expediting component 27 capable of expediting a determination of whether to perform cell reselection to the second wireless communication technology based on the detected cell of the second wireless communication technology satisfying the first reselection criterion and being associated with a preferred technology based on preference scheme 31. For example, the second wireless communication technology may be preferred relative to the first wireless communication technology based on a preference value of a preference scheme 31. For instance, for a variety of reasons, the second wireless communication technology may be preferred relative to the first wireless communication technology, such as when the second wireless communication technology provides an improved quality of service or other improved or different characteristic(s) relative to the first wireless communication technology. For example, in an exemplary implementation, the first wireless technology is WCDMA and the second wireless technology is LTE, where LTE is preferred over WCDMA because LTE provides improved data capacity and/or data rates over WCDMA. As such, the expediting component 27 operates to increase a frequency of measuring the detected cell or the group of frequencies 13 associated with the detected cell 32 so that at least one new measurement occurs prior to an expiration of a reselection time period 28.

Additionally, the reselection expeditor component 14 may also include a reselecting component 29 capable of determining to reselect to the detected cell of the second wireless communication technology when that the at least one new measurement satisfies a second reselection criterion for the reselection time period. For example, reselecting component 29 may communicate with determining component 25, which receives at least one new measurement of the signal of the detected cell 32 based on the increased measurement frequency and determines the new measurement meets reselection criteria 26. In this case, for example, reselection criteria 26 may be a second threshold (e.g., a received power level threshold, which may have a same value as the first received power level threshold) corresponding to reselection time period 28. In other words, when determining component 25 identifies that detected cell 32 satisfies reselection criteria 26 for reselection time period 28, then reselecting component 29 may execute reselection procedures to cause wireless device 10 to reselect to detected cell 32.

Thus, as shown, wireless device 10 may include operating component 21, detecting component 23, determining component 25, expediting component 27, and reselecting component 29 configured, for example, to carry out method(s) associated with those components, such as those discussed herein. Additional explanation of the operation of these various components will be provided below.

It should be noted that the components (also referred to herein as modules and/or means) of FIG. 2 may be, for example, hardware components specifically configured to carry out the stated processes/algorithm, software components implemented by a processor configured to perform the stated processes/algorithm, and/or software components stored within a computer-readable medium for implementation by a processor, or some combination.

Figure 3:
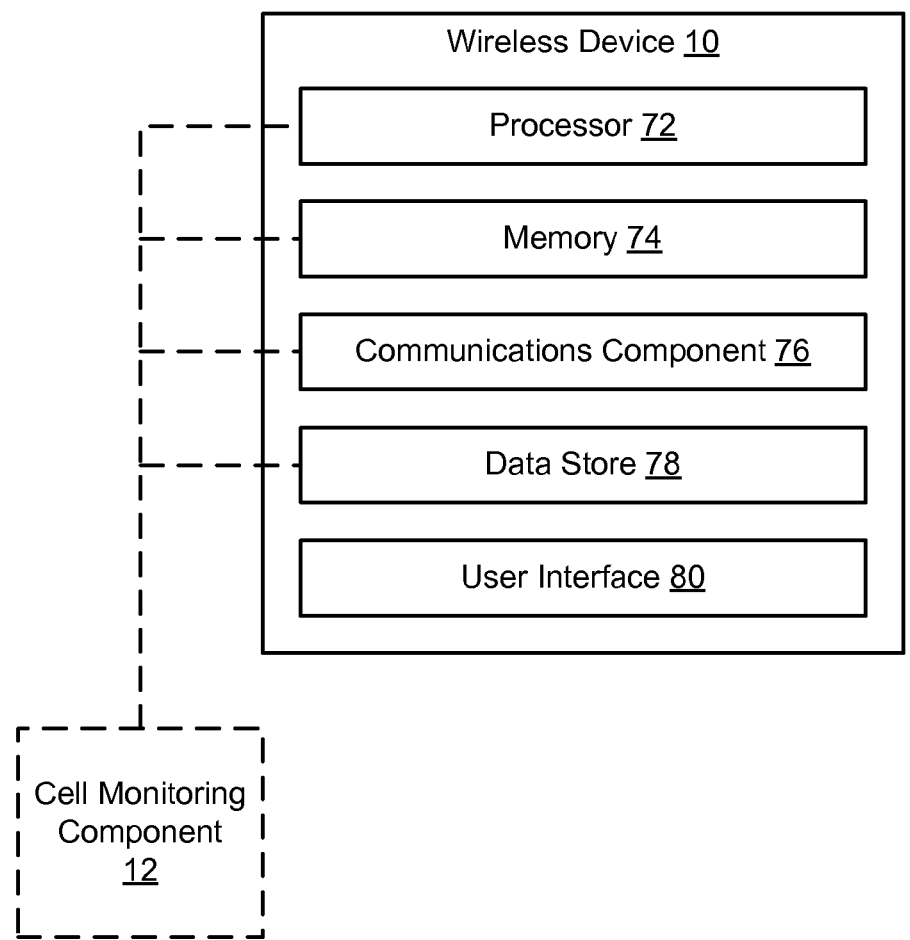
FIG. 3 is a block diagram of an aspect of the wireless device of FIG. 1 and FIG. 2.

Referring to FIG. 3, in one aspect, wireless device 10 (FIG. 1 and FIG. 2) may additionally include a processor 72 for carrying out processing functions associated with one or more of components and functions described herein. Processor 72 can include a single or multiple set of processors or multi-core processors. Moreover, processor 72 can be implemented as an integrated processing system and/or a distributed processing system. Additionally, processor 72 may be configured or specially-programmed with hardware, software, and/or firmware to perform one or more of the functions described herein with respect to cell monitoring component 12.

Wireless device 10 further includes a memory 74, such as for storing data used herein and/or local versions of applications or computer-readable instructions being executed by processor 72, e.g. to perform one or more of the functions described herein with respect to cell monitoring component 12. Memory 74 can include any type of memory usable by a computer, such as random access memory (RAM), read only memory (ROM), tapes, magnetic discs, optical discs, volatile memory, non-volatile memory, and any combination thereof.

Further, wireless device 10 includes a communications component 76 that provides for establishing and maintaining communications with one or more parties utilizing hardware, software, and services as described herein. Communications component 76 may carry communications between components on wireless device 10, as well as between wireless device 10 and external devices, such as devices located across a wired or wireless communications network and/or devices serially or locally connected to wireless device 10. For example, communications component 76 may include one or more buses, and may further include transmit chain components and receive chain components associated with a transmitter and receiver, respectively, or a transceiver, operable for interfacing with external devices. In an additional aspect, communications component 76 may include transmitters and receivers, or transceivers, and corresponding transmit and receive chain components, for more communication with more than one technology type network. Further, communications component 76 may be specially configured to perform one or more functions described herein with respect to cell monitoring component 12.

Additionally, wireless device 10 may further include a data store 78, which can be any suitable combination of hardware and/or software, that provides for mass storage of information, databases, and programs employed in connection with aspects described herein. For example, data store 78 may be a data repository for applications not currently being executed by processor 72, such as applications associated with cell monitoring component 12.

Wireless device 10 may additionally include a user interface component 80 operable to receive inputs from a user of wireless device 10, and further operable to generate outputs for presentation to the user. User interface component 80 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 80 may include one or more output devices, including but not limited to a display, a speaker, a haptic feedback mechanism, a printer, any other mechanism capable of presenting an output to a user, or any combination thereof.

In the present aspects, wireless device 10 may further include cell monitoring component 12, for example, as a separate component or within or as part of processor 72, memory 74, communications component 76, or data store 78, or some combination thereof. For example, cell monitoring component 12 may include specially programmed computer readable instructions or code, firmware, hardware, or some combination thereof, for performing the functions described herein.

Figure 4:
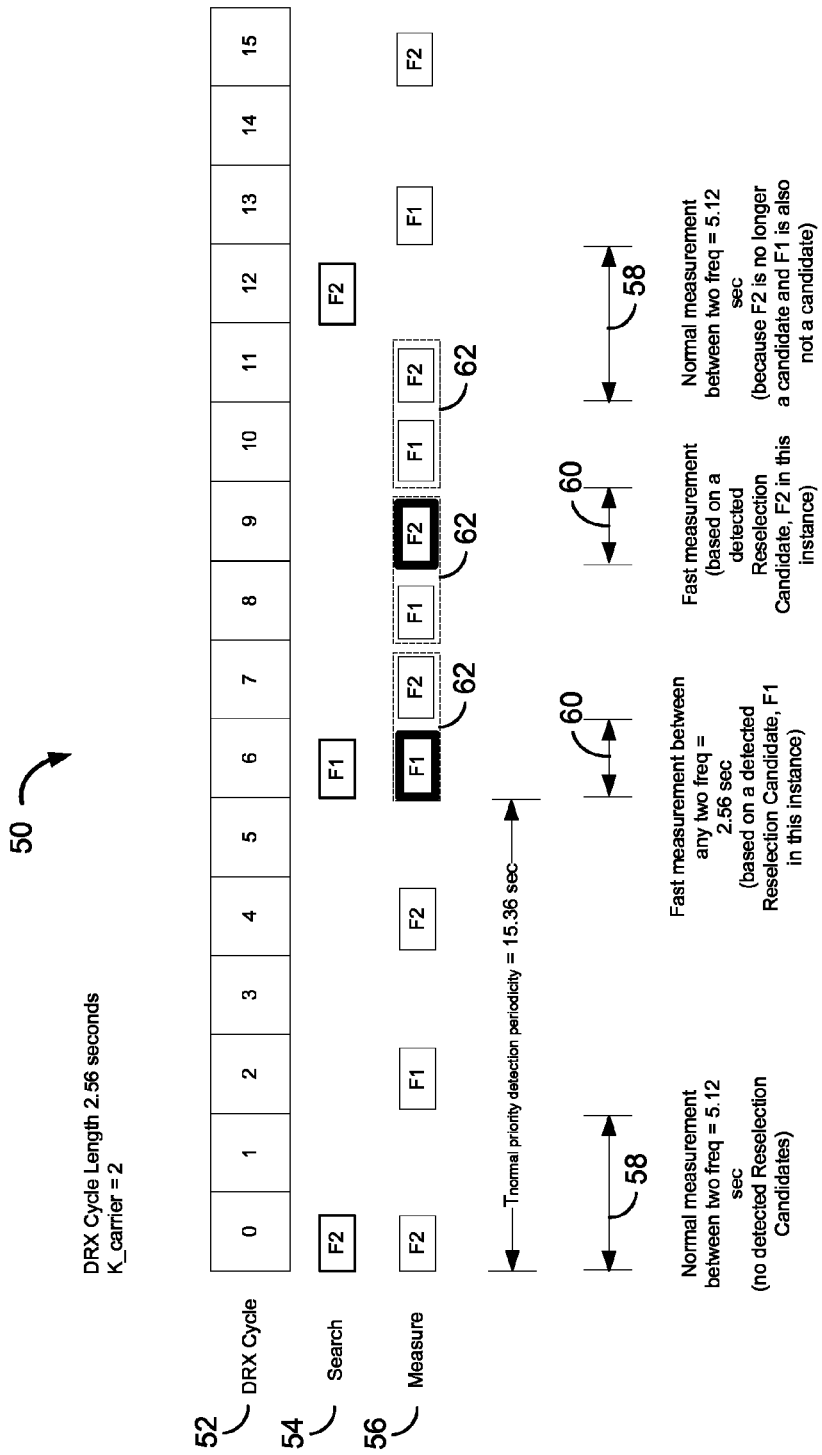
FIG. 4 is a timeline of an example use case according to the present aspects.

FIG. 4 illustrates an exemplary timeline 50 for a specific use case of an exemplary method according to one aspect where fast measurement scheduling of a group of frequencies is based on a detected cell satisfying a reselection criterion. In the use case of timeline 50, a DRX cycle 52 has a length of 2.56 seconds, a number of frequencies to be searched for cell reselection, K_carrier, is two frequencies, F1 and F2 (i.e., K_carrier=2), where a search periodicity 54, e.g. a normal priority detection search periodicity, for each frequency has an interval of 5.12 seconds between frequencies and a measurement periodicity 56 has an interval that varies between a normal measurement periodicity 58 for each frequency and a fast measurement periodicity 60 for the group 62 of frequencies F1 and F2.

For example, at DRX 0, both F1 and F2 are detected but neither satisfies a reselection criteria, such as reselection criteria 26 (FIG. 2), and thus measurement periodicity 56 is normal measurement periodicity 58. However, at DRX 6, F1 is determined to satisfy the reselection criteria, as indicated by the bold line of the F1 box, and thereby triggering a switch to fast measurement periodicity 60 for the group 62 of frequencies F1 and F2 until reselection occurs (not represented in FIG. 4) or neither F1 nor F2 satisfies the reselection criteria.

Though F1 is determined not to satisfy the reselection criteria at DRX8, F2 at DRX 9 is determined to satisfy the reselection criteria, and thereby a continuation of the fast measurement periodicity 60 for the group 62 of frequencies F1 and F2 occurs at DRX 10 and DRX 11.

During the frequency measurements of DRX 10 and 11, it is determined that neither F1 nor F2 satisfies the reselection criteria and therefore the continuation of the fast measurement periodicity 60 for the group 62 of frequencies F1 and F2 expires. In other words, after the measurements at DRX 10 and DRX 11, where neither F1 nor F2 satisfies the reselection criteria, the present aspects trigger a switch back to normal measurement periodicity 58 for each of frequencies F1 and F2.

Figure 5:
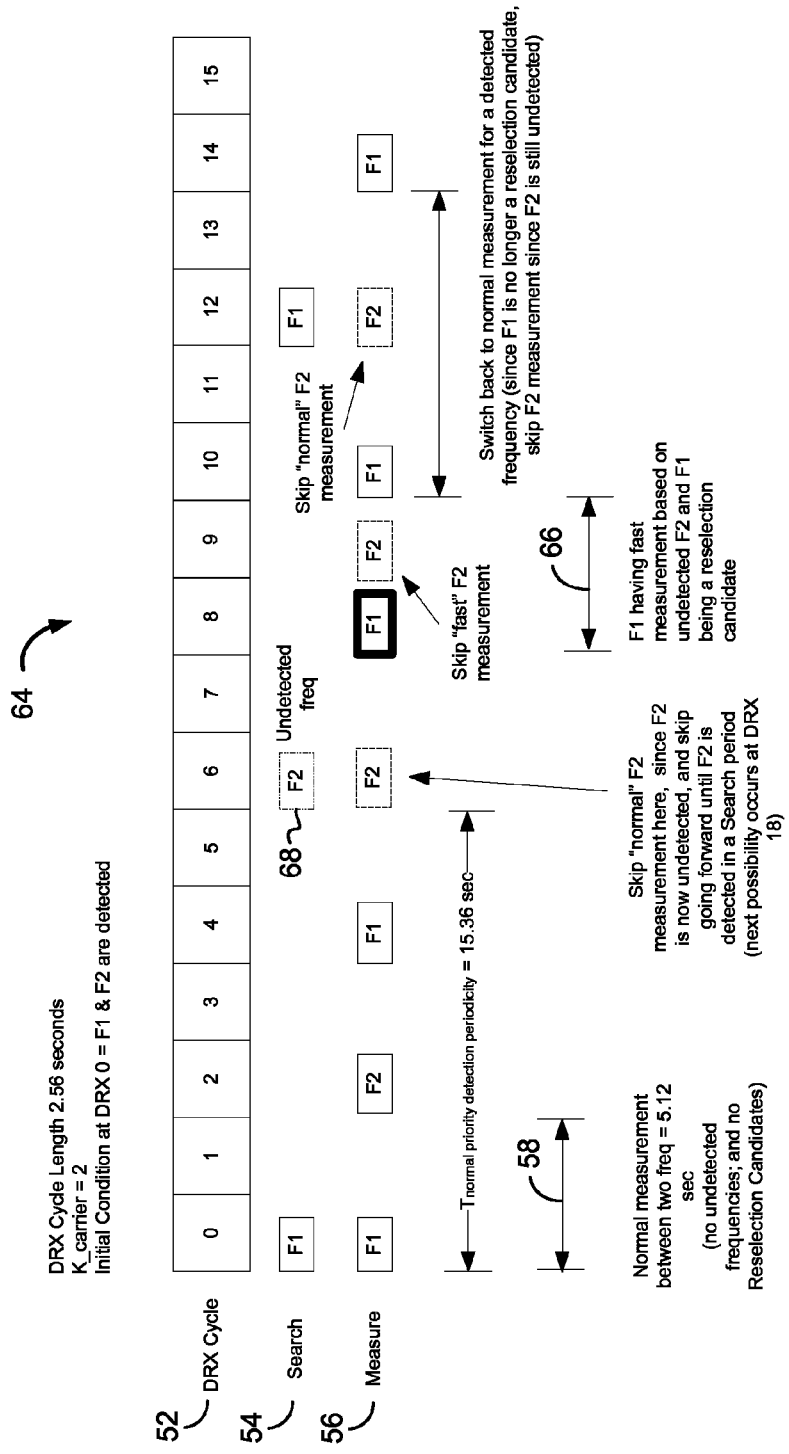
FIG. 5 is a timeline of another example use case according to the present aspects.

Referring to FIG. 5, another example of a timeline 64 for a specific use case represents operation of the present apparatus and methods according to one aspect where fast measurement scheduling of one or more frequencies is based on an undetected frequency, or conversely as a factor of a number of detected cells. In the use case of timeline 64, DRX cycle 52 has a length of 2.56 seconds, a number of frequencies to be searched for cell reselection, K_carrier, is two frequencies, F1 and F2, where search periodicity 54, e.g. a normal priority detection search periodicity, for each frequency has an interval of 5.12 seconds between frequencies and measurement periodicity 56 has an interval that varies between normal measurement periodicity 58 for each frequency and a fast measurement periodicity 66 for the detected frequency F1 that includes skipping measurements of undetected frequency F2 going forward until F2 is detected in a search period, as represented by 68 at DRX 6, resulting from failure to detect any cells during monitoring of F2 during the DRX 6 instance of search periodicity 54.

At DRX 8, F1 is determined to satisfy the reselection criteria, as indicated by the bold line of the F1 box, and thereby triggering a switch to fast measurement periodicity for the group 62 of frequencies F1 and F2. However, since F2 was not detected during the prior search period (at DRX 6), the call monitoring component 12 skips the fast F2 measurement periodicity at DRX 9.

Since F1 at DRX 10 is determined to not satisfy the reselection criteria, the reselection expeditor component 14 switches back to a normal measurement periodicity. Again, since F2 was not detected during the prior search period, the call monitoring component 12 skips the fast F2 measurement periodicity at DRX 12 until F2 is detected in a search period.

Figure 6:
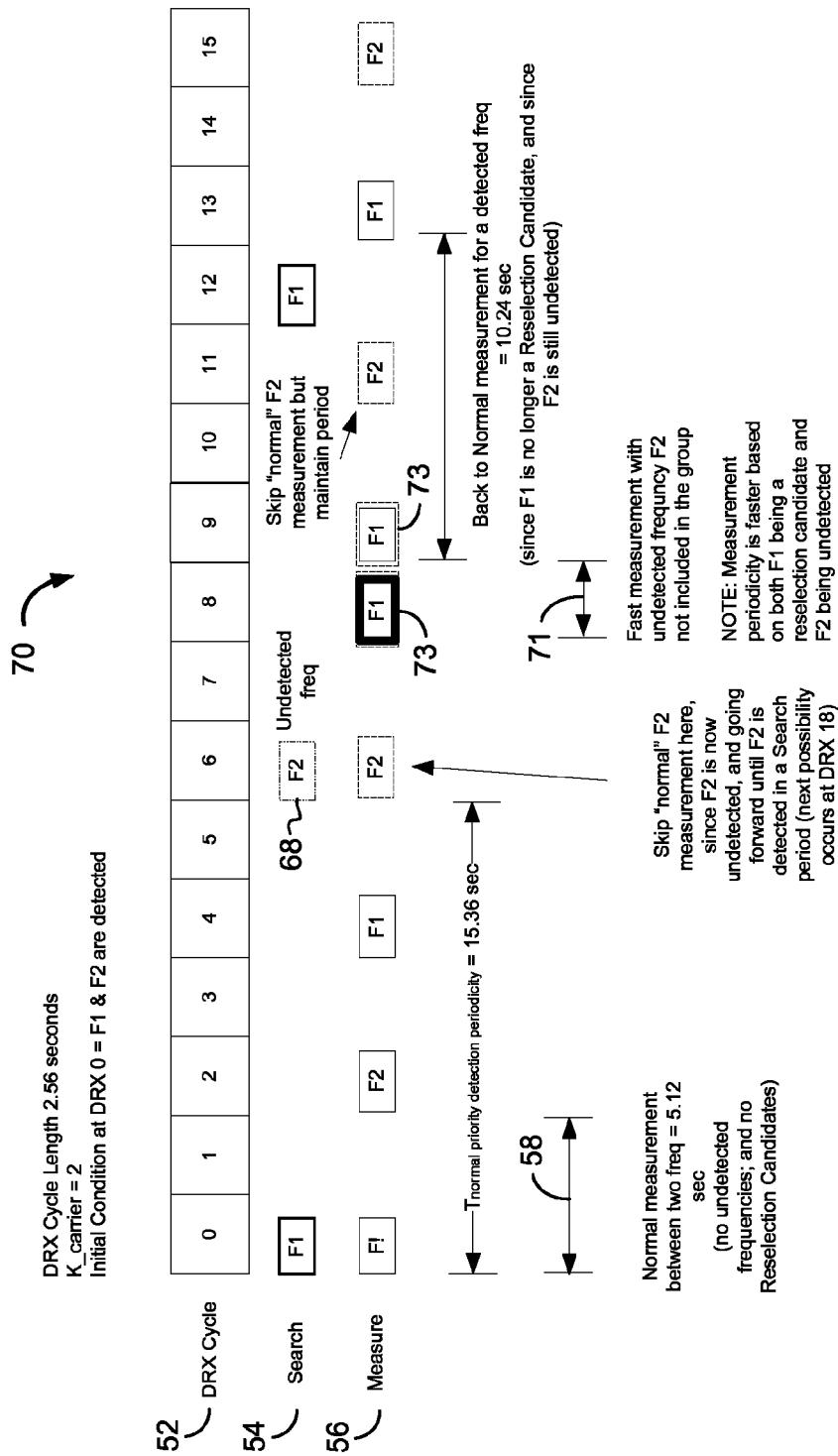
FIG. 6 is a timeline of a further example use case according to the present aspects.

Referring to FIG. 6, a further example of a timeline 70 for a specific use case represents operation of the present apparatus and methods according to a combined aspect where fast measurement scheduling of a group of frequencies is based on a first factor corresponding to a detected cell satisfying a reselection criterion and a second factor corresponding to an undetected frequency, or a number of detected cells. In the use case of timeline 70, DRX cycle 52 has a length of 2.56 seconds, a number of frequencies to be searched for cell reselection, K_carrier, is two frequencies, F1 and F2, where search periodicity 54, e.g. a normal priority detection search periodicity, for each frequency has an interval of 5.12 seconds between frequencies and measurement periodicity 56 has an interval that varies between normal measurement periodicity 58 for each frequency and a fast measurement periodicity 71 for the group 73 of detected frequencies, only F1 in this case as F2 is an undetected frequency 68 as represented at DRX 6.

At DRX 8, F1 is determined to satisfy the reselection criteria, as indicated by the bold line of the F1 box, and thereby triggering a switch to fast measurement periodicity for the group 62 of frequencies F1 and F2. However, since only F2 was not detected during the prior search period (at DRX 6), the call monitoring component 12 searches for F1 at DRX 9.

Since F1 at DRX 9 at DRX 10 is determined not satisfy the reselection criteria, the reselection expeditor component 14 switches back to a normal measurement periodicity. Again, since F2 was not detected during the prior search period, the call monitoring component 12 skips the fast F2 measurement periodicity at DRX 13 until F2 is detected in a search period.

Figure 7:
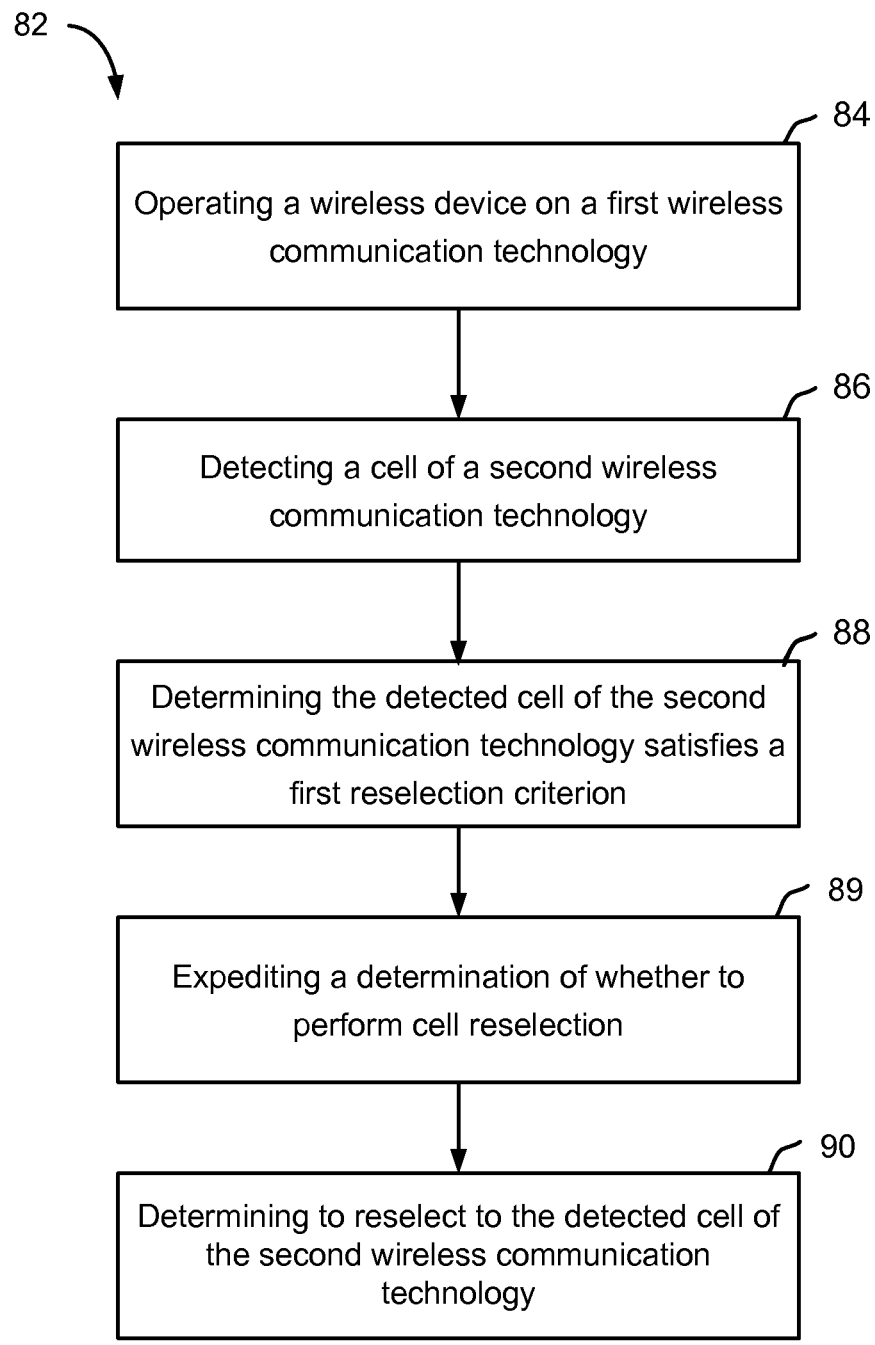
FIG. 7 is a flowchart of an aspect of a method of monitoring radio channels.

Referring to FIG. 7, in operation, an example method 82 for monitoring wireless signals is provided. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments. Further, for illustrative purposes, FIG. 7 will be discussed with reference to FIGS. 1-3.

In one aspect, at block 84, method 82 includes operating a wireless device on a first wireless communication technology. For example, wireless device 10 may execute processor 72 to operate operating component 21 according to first technology mode 30.

Further, at block 86, method 82 includes detecting a cell of a second wireless communication technology, wherein the second wireless communication technology is preferred relative to the first wireless communication technology. For example, cell monitoring component 12 may execute detecting component 23 to monitor one or more frequencies, e.g. one or more of group of frequencies 13, and detect a cell, e.g. detected cell 32, on a monitored frequency (FIG. 1).

Additionally, at block 88, method 82 includes determining the detected cell of the second wireless communication technology satisfies a first reselection criterion based on a first measurement. For example, cell monitoring component 12 may execute determining component 25 to determine that detected cell 32, or another reselection candidate cell detected on group of frequencies 13, satisfies reselection criterion 26 for reselection time period 28 for cell reselection (FIG. 1).

At block 89, method 82 includes expediting a determination of whether to perform cell reselection to the second wireless communication technology based on the detected cell of the second wireless communication technology satisfying the first reselection criterion, wherein the expediting comprises increasing a frequency of measuring the detected cell so that at least one new measurement occurs prior to an expiration of a reselection time period. For example, cell monitoring component 12 may execute reselection expeditor component 14 to speed up the frequency of subsequent measurements for detected cell 32 or group of frequencies 13 based on detected cell 32 satisfying reselection criterion 26 (FIG. 1), such as discussed with reference to FIGS. 3-6.

At block 90, method 82 includes determining to reselect to the detected cell of the second wireless communication technology when that the at least one new measurement satisfies a second reselection criterion for the reselection time period. For example, cell monitoring component 12 may execute reselecting component 29 to reselect to the detected cell 32 of the second technology mode 34 based on the detected cell 32 satisfying reselection criterion 26 (FIG. 1).

Figure 8:
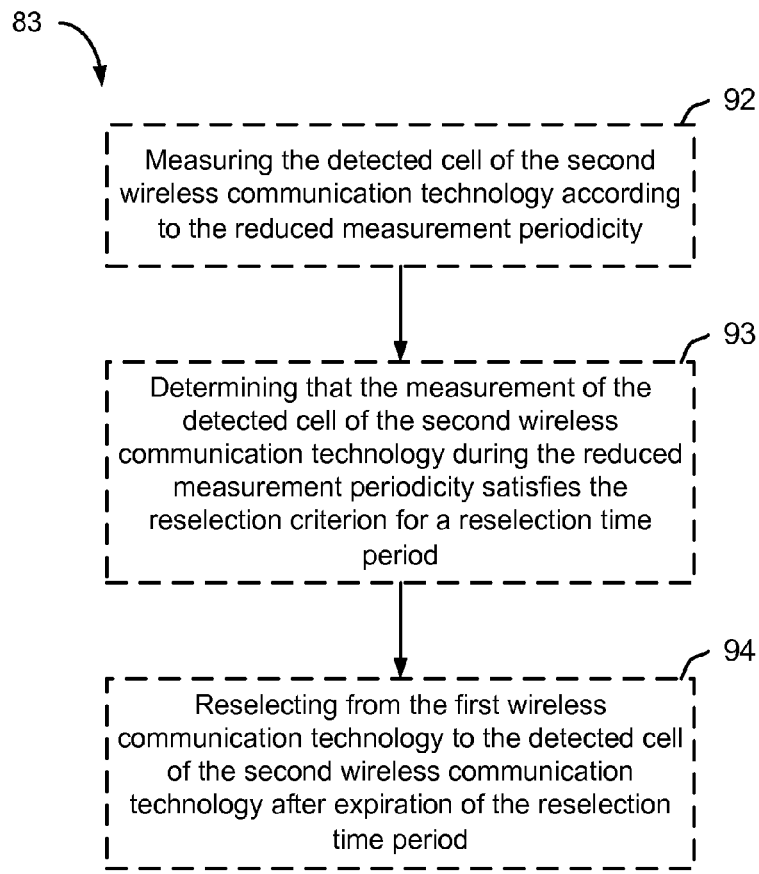
FIG. 8 is a flowchart of an another aspect of a method of monitoring radio channels.

FIG. 8 illustrates optional blocks 92-94 that describe in more detail the actions of blocks 89 and 90 of FIG. 7. These optional actions are referred to as method 83. As shown, optionally, at block 92, method 83 includes measuring the detected cell of the second wireless communication technology according to the reduced measurement periodicity. For example, cell monitoring component 12 may perform monitoring and measuring of detected cell 32 and/or group of frequencies 13 based on fast measurement periodicity 38 (FIG. 1).

Optionally, at block 93, method 83 may further include determining that the measurement of the detected cell of the second wireless communication technology during the reduced measurement periodicity satisfies the reselection criterion for a reselection time period. For example, cell monitoring component 12 may determine that detected cell 32, or another reselection candidate cell detected on group of frequencies 13, satisfies reselection criterion 26 for reselection time period 28 based on one or more measurements made according to fast measurement periodicity 38 (FIG. 1).

Optionally, at block 94, method 83 may further include reselecting from the first wireless communication technology to the detected cell of the second wireless communication technology after expiration of the reselection time period. For example, cell monitoring component 12 may determine to reselect to detected cell 32, or another reselection candidate cell detected on group of frequencies 13, once reselection criterion 26 is satisfied for reselection time period 28 based on one or more measurements made according to fast measurement periodicity 38 (FIG. 1). Thus, for example, wireless device 10 may switch to operate in second technology mode 34.

A number of example use cases implementing the principles of the present apparatus and methods are described below. These use cases may be carried out, for example, by wireless device 10 executing cell monitoring component 12 of FIG. 1, and/or any components thereof such as reselection expediting component 14.

For, example, in an aspect, the reselection to LTE requires UE to first search and measure LTE cells. From 3GPP specification 25.133, Section 4.2.3.5, the E-UTRA layers need to be searched based on the following rules:

For high Priority Mode: (SrxlevServingCell>Sprioritysearch1 and SqualServingCell>Sprioritysearch2)
    Search higher priority E-UTRA layers
    Search at least every Thigher_priority_search=60*Nlayer where Nlayers is the total number of configured higher priority layers
    For all Priority Mode: (SrxlevServingCell<=Sprioritysearch1 or SqualServingCell<=Sprioritysearch2)
    Search higher and lower priority E-UTRA layers
    Detect and evaluate detectable cells within Kcarrier*TdetectE-UTRA, where TdetectEUTRA is given in Table 1:

TABLE 1

$T_{detect}$, $T_{measure}$ and $T_{evaluate}$ for E-UTRA Cells

| DRX cycle length [s] | $T_{detectE-UTRA}$ [s] | $T_{measureE-UTRA}$ [s] (number of DRX cycles) | $T_{evaluateEUTRA}$ [s] (number of DRX cycles) |
|---|---|---|---|
| 0.08 | 30 | 2.56 (32) | 7.68 (96) |
| 0.16 |  | 2.56 (16) | 7.68 (48) |
| 0.32 |  | 5.12 (16) | 15.36 (48) |
| 0.64 |  | 5.12 (8) | 15.36 (24) |
| 1.28 |  | 6.4 (5) | 19.2 (15) |
| 2.56 | 60 | 7.68 (3) | 23.04 (9) |
| 5.12 |  | 10.24 (2) | 30.72 (6) |

From 3GPP specification 25.133, Section 4.2.3.5, the E-UTRA layers need to be measured based on the following rules:

High Priority Mode: (SrxlevServingCell>Sprioritysearch1 and SqualServingCell>Sprioritysearch2)
    All layers measured at least every TmeasureE-UTRA, where TmeasureE-UTRA is given in Table 1.
    All Priority Mode: (SrxlevServingCell<=Sprioritysearch1 or SqualServingCell<=Sprioritysearch2)
    Measured at least every Kcarrier*Tmeasure, EUTRA, where Kcarrier is the number of EUTRAN carriers.

When the specification-required measurement rules are applied and when Treselection is not equal to zero (typically set to 1 or 2 seconds by operator), the UE can be very slow reselecting to E-UTRAN cells. Specifically, in all priority mode, the UE needs to ensure that the measurement of the new E-UTRAN cell is better ranked than the serving cell at least during the time interval Treselection (or Tresel).

In high priority mode, the UE needs to ensure that the measured power level of the new EUTRAN cell is greater than Threshx,high (if the E-UTRAN frequency is higher priority than the serving frequency) or Threshx,low (if lower priority) during the time interval Treselection.

For example, if DRX=2.56 and Tresel=2 seconds, in high priority mode, from Table 1, the UE needs 7.68 seconds to take two consecutive measurements. If both measurements are above the thresholds, the UE can start the reselection process. The delay of 7.68 seconds prior to reselection is much higher than the 2 seconds Tresel requirement and may be optimized to speed up reselection, such as to reselect from WCDMA to LTE.

According, as described with respect to the present apparatus and methods, the measurements of all Kcarrier frequencies may be considered as a group for both high priority and all priority modes. During each cell measurement group, the UE decides whether the reselection criteria have been satisfied for any cell in all frequencies. If so, then the UE will use the fast measurement periodicity to schedule the next measurement group for all layers. As can be seen in Table 2 and Table 3, in one non-limiting example for this use case, the fast measurement periodicity is at least two times faster than the normal measurement periodicity. If the reselection criteria have not been met for any cell, then the UE will use the normal measurement periodicity.

TABLE 2

Cell Measurement Periodicity for W2L Idle (High Priority Mode)

| DRX Cycle Length (sec) | Normal Measurement Periodicity (DRX cycles) | Normal Measurement Periodicity (sec) | Fast Measurement Periodicity (DRX cycles) | Fast Measurement Periodicity (sec) | Spec Req (sec) |
|---|---|---|---|---|---|
| 0.08 | 32 | 2.56 | 16 | 1.28 | 2.56 |
| 0.16 | 16 | 2.56 | 8 | 1.28 | 2.56 |
| 0.32 | 16 | 5.12 | 8 | 2.56 | 5.12 |
| 0.64 | 8 | 5.12 | 4 | 2.56 | 5.12 |
| 1.28 | 5 | 6.4 | 2 | 2.56 | 6.4 |
| 2.56 | 3 | 7.68 | 1 | 2.56 | 7.68 |
| 5.12 | 2 | 10.24 | 1 | 5.12 | 10.24 |

TABLE 3

Cell Measurement Periodicity for W2L Idle (All Priority Mode)

| DRX Cycle Length (sec) | Normal Measurement Periodicity (DRX cycles) | Normal Measurement Periodicity (sec) | Fast Measurement Periodicity (DRX cycles) | Fast Measurement Periodicity (sec) | Spec Req (sec) |
|---|---|---|---|---|---|
| 0.08 | $32 * K_{carrier}$ | $2.56 * K_{carrier}$ | $16 * K_{carrier}$ | $1.28 * K_{carrier}$ | $2.56 * K_{carrier}$ |
| 0.16 | $16 * K_{carrier}$ | $2.56 * K_{carrier}$ | $8 * K_{carrier}$ | $1.28 * K_{carrier}$ | $2.56 * K_{carrier}$ |
| 0.32 | $16 * K_{carrier}$ | $5.12 * K_{carrier}$ | $8 * K_{carrier}$ | $2.56 * K_{carrier}$ | $5.12 * K_{carrier}$ |
| 0.64 | $8 * K_{carrier}$ | $5.12 * K_{carrier}$ | $4 * K_{carrier}$ | $2.56 * K_{carrier}$ | $5.12 * K_{carrier}$ |
| 1.28 | $4 * K_{carrier}$ | $5.12 * K_{carrier}$ | $2 * K_{carrier}$ | $2.56 * K_{carrier}$ | $6.4 * K_{carrier}$ |
| 2.56 | $2 * K_{carrier}$ | $5.12 * K_{carrier}$ | $1 * K_{carrier}$ | $2.56 * K_{carrier}$ | $7.68 * K_{carrier}$ |
| 5.12 | $1 * K_{carrier}$ | $5.12 * K_{carrier}$ | $1 * K_{carrier}$ | $5.12 * K_{carrier}$ | $10.24 * K_{carrier}$ |

Figure 9:
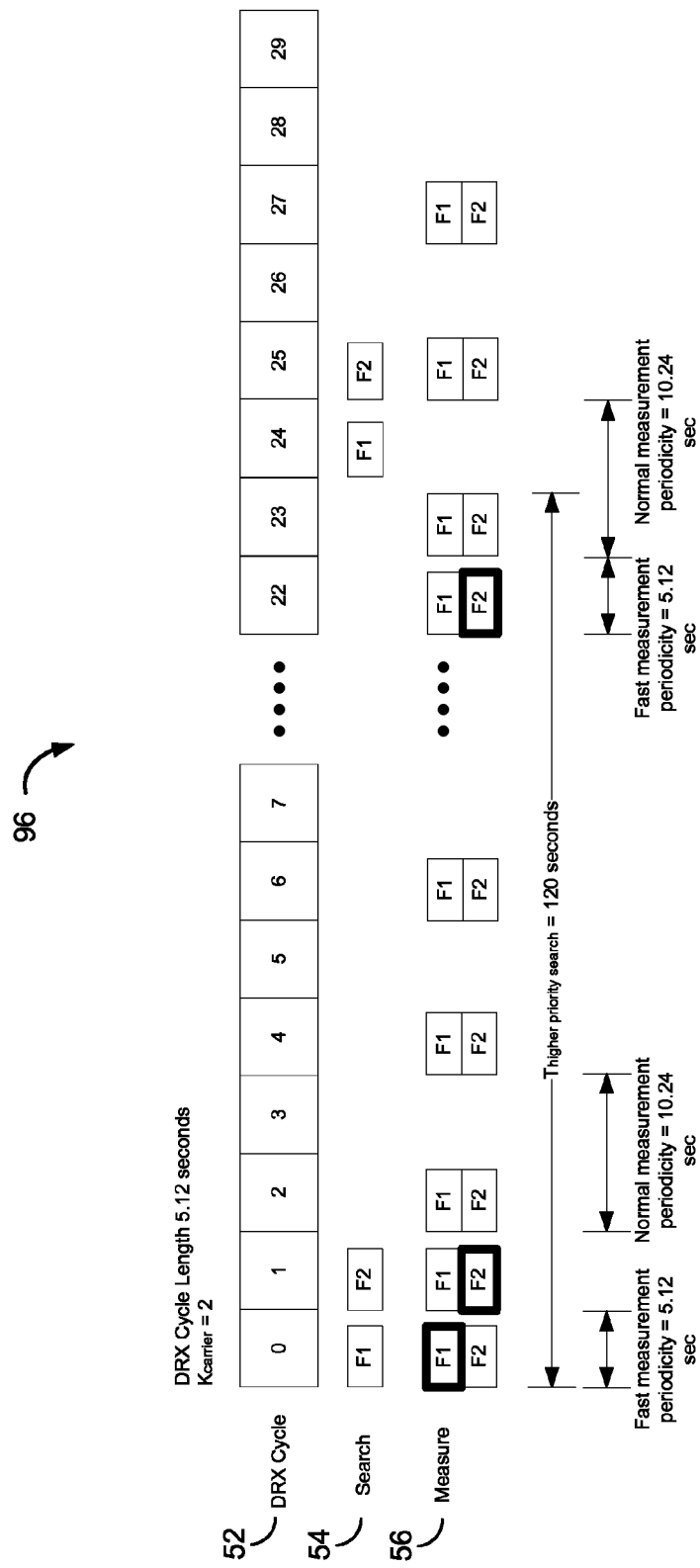
FIG. 9 is a timeline of an example use case according to the present aspects.
Figure 10:
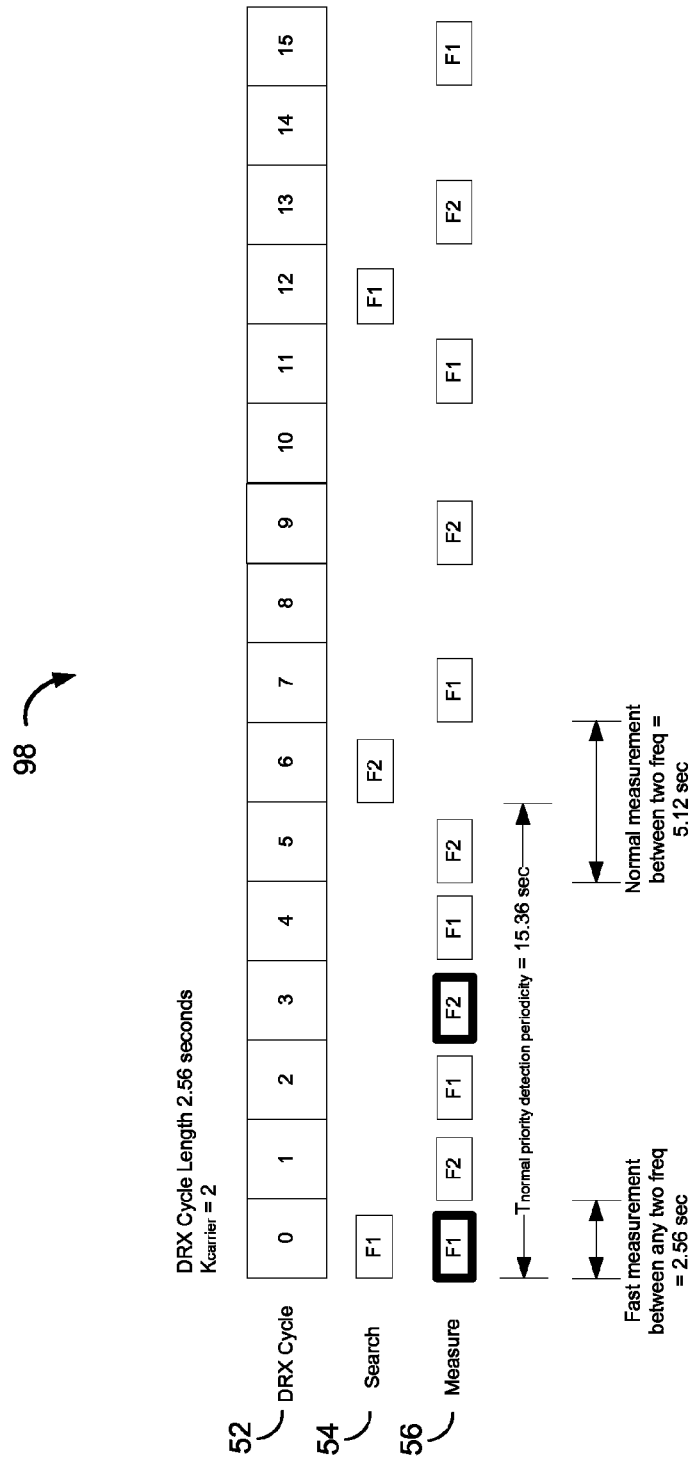
FIG. 10 is a timeline of another example use case according to the present aspects.

Referring to FIGS. 9 and 10, timelines 96 and 98, respectively, use examples to illustrate the fast measurement scheduling design. As discussed, the fast measurement periodicity may be used when the reselection criteria is met for at least one cell. In FIGS. 8 and 9, the bold line of the F1/F2 box is used to illustrate that the reselection criteria condition is met for a given frequency. If one frequency satisfies the reselection criteria over more than Treselection duration, then UE will reselect to that cell. Additionally, timeline 96 of FIG. 9 and timeline 98 of FIG. 10 includes DRX cycle 52, search periodicity 54, and measurement periodicity 56 described in FIGS. 4-6.

Further, for example, timeline 96 of FIG. 9 represents a high priority mode with normal and fast measurement periodicity searches, where the frequency of F1 at DRX 0 satisfies the reselection criteria and where the frequency of F2 at DRX 2 satisfies the reselection criteria.

Also, in FIG. 10, timeline 98 represents an example of an all priority mode measurement scheduling with normal and fast measurement periodicity. As discussed, the fast measurement periodicity is used when the reselection criteria is met. If one frequency satisfies the reselection criteria over more than Treselection duration, then UE will reselect to that cell.

In an alternative or addition aspect, it is possible in practice that some E-UTRAN frequencies are provisioned in the measurement control system information, but the UE does not detect any suitable cells in these frequencies. If the UE follows the specification requirement, then the measurements and reselection performed by the UE are greatly delayed.

For example, say DRX=2.56 seconds and Tresel=2 seconds, and four E-UTRAN frequencies (f1, f2, f3, f4) are provisioned by the network, but the UE only detects E-UTRAN cells on frequency f1. In all priority mode, since the measurement of all frequencies are run in round-robin, the UE needs to wait 5.12*4=20.48 seconds (with normal measurement periodicity) or 2.56*4=10.24 seconds (with fast measurement scheduling periodicity) before it can re-measure the detected cells in f1. This is very slow compared with the 2 second Tresel requirement.

According to the described apparatus and methods, in one non-limiting aspect for the all priority mode, the present aspects may replace the $K_{carrier}$ by $K_{detected}$ in the fast measurement periodicity columns, where the $K_{detected}$ indicates the number of E-UTRAN frequencies that the UE successfully detected cells. In this case, the present aspect may not replace $K_{carrier}$ by $K_{detected}$ in normal measurement periodicity columns, because speeding up the measurement without a reselection candidate can be a waste of value battery power. The following table provides a proposed measurement periodicity.

TABLE 4

Proposed Cell Measurement Periodicity for W2L Idle (All Priority Mode)

| DRX Cycle Length (sec) | Normal Measurement Periodicity (DRX cycles) | Normal Measurement Periodicity (sec) | Fast Measurement Periodicity (DRX cycles) | Fast Measurement Periodicity (sec) | Spec Req (sec) |
|---|---|---|---|---|---|
| 0.08 | $32 * K_{carrier}$ | $2.56 * K_{carrier}$ | $16 * K_{detected}$ | $1.28 * K_{detected}$ | $2.56 * K_{carrier}$ |
| 0.16 | $16 * K_{carrier}$ | $2.56 * K_{carrier}$ | $8 * K_{detected}$ | $1.28 * K_{detected}$ | $2.56 * K_{carrier}$ |
| 0.32 | $16 * K_{carrier}$ | $5.12 * K_{carrier}$ | $8 * K_{detected}$ | $2.56 * K_{detected}$ | $5.12 * K_{carrier}$ |
| 0.64 | $8 * K_{carrier}$ | $5.12 * K_{carrier}$ | $4 * K_{detected}$ | $2.56 * K_{detected}$ | $5.12 * K_{carrier}$ |
| 1.28 | $4 * K_{carrier}$ | $5.12 * K_{carrier}$ | $2 * K_{detected}$ | $2.56 * K_{detected}$ | $6.4 * K_{carrier}$ |
| 2.56 | $2 * K_{carrier}$ | $5.12 * K_{carrier}$ | $1 * K_{detected}$ | $2.56 * K_{detected}$ | $7.68 * K_{carrier}$ |
| 5.12 | $1 * K_{carrier}$ | $5.12 * K_{carrier}$ | $1 * K_{detected}$ | $5.12 * K_{detected}$ | $10.24 * K_{carrier}$ |

Additionally, according to the present aspects, in a high priority mode, since the measurement scheduling is independent of $K_{carrier}$, there is no need to make the changes. For completeness, we provide the following Table from the design document.

TABLE 5

Cell Measurement Periodicity for W2L Idle (High Priority Mode)

| DRX Cycle Length (sec) | Normal Measurement Periodicity (DRX cycles) | Normal Measurement Periodicity (sec) | Fast Measurement Periodicity (DRX cycles) | Fast Measurement Periodicity (sec) | Spec Req (sec) |
|---|---|---|---|---|---|
| 0.08 | 32 | 2.56 | 16 | 1.28 | 2.56 |
| 0.16 | 16 | 2.56 | 8 | 1.28 | 2.56 |
| 0.32 | 16 | 5.12 | 8 | 2.56 | 5.12 |
| 0.64 | 8 | 5.12 | 4 | 2.56 | 5.12 |
| 1.28 | 5 | 6.4 | 2 | 2.56 | 6.4 |
| 2.56 | 3 | 7.68 | 1 | 2.56 | 7.68 |
| 5.12 | 2 | 10.24 | 1 | 5.12 | 10.24 |

In both cases, in an aspect, the present apparatus and methods may not issue a measurement scheduling command for undetected frequencies. If the command is issued, then the modem (RF and baseband), e.g. part of communication component 76 (FIG. 5) has to stay awake for more time, thereby unnecessarily consuming battery power.

Figure 11:
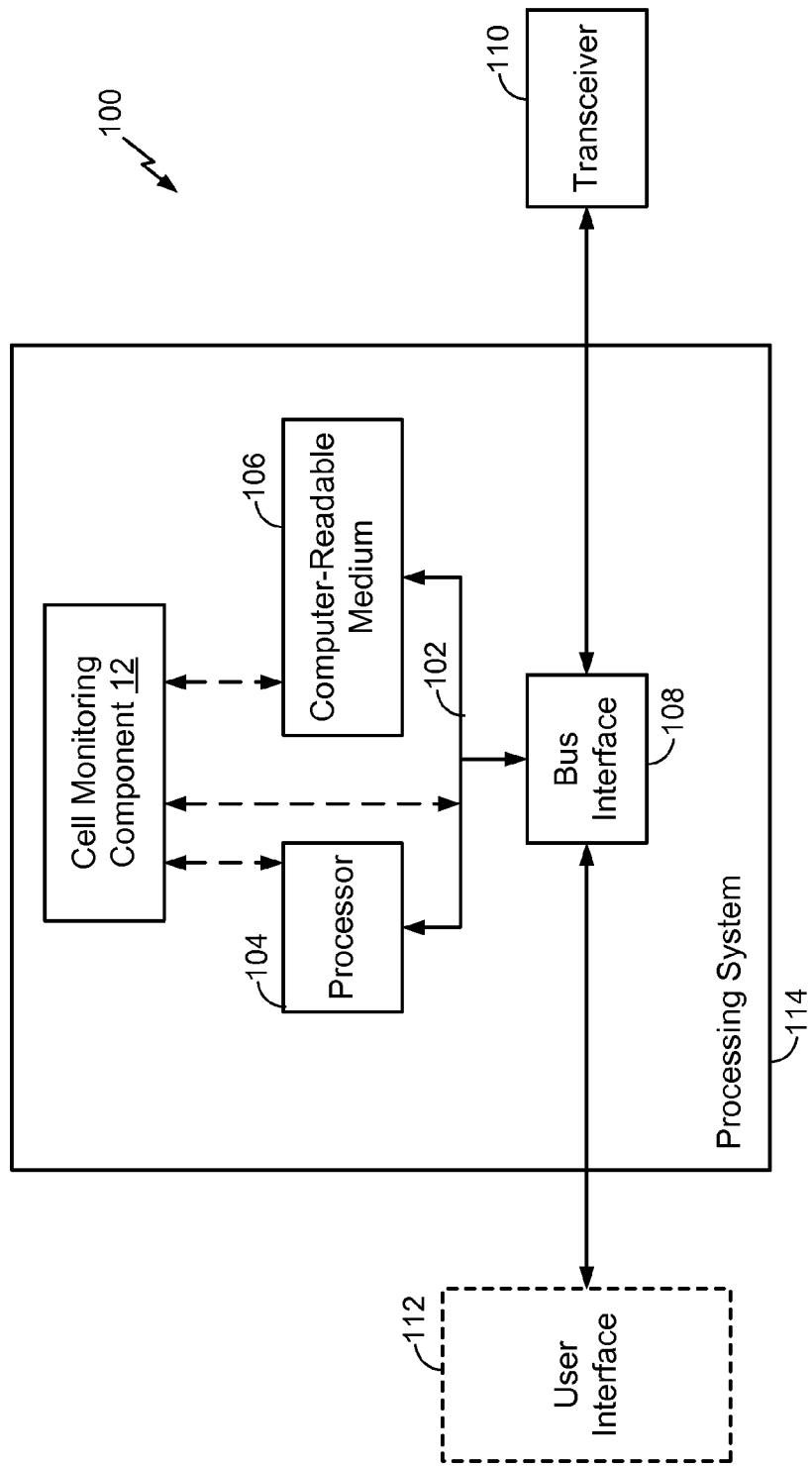
FIG. 11 is a block diagram illustrating an example of a hardware implementation for an apparatus employing a processing system and configured to perform the functions described herein.

FIG. 11 is a block diagram illustrating an example of a hardware implementation for an apparatus 100 employing a processing system 114. Apparatus 100 may be configured to include, for example, wireless device 10 (FIG. 1 or FIG. 2) and/or cell monitoring component 12 (FIG. 1) as described above. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104, as will be described further below, is responsible for managing the bus 102 and general processing, including the execution of software stored on the computer-readable medium 106. The software, when executed by the processor 104, causes the processing system 114 to perform the various functions described infra for any particular apparatus. The computer-readable medium 106, as will be described further below, may comprise volatile and/or non-volatile storage and may also be used for storing data that is manipulated by the processor 104 when executing software. Note, each and every element/component/module/means of FIGS. 1-2 and 6 may be implemented by processor 104 and computer-readable medium 106, which causes the processing system 114 to perform the various functions/processes/algorithms described in FIGS. 1-11.

The various concepts presented throughout this disclosure may be implemented across a broad variety of telecommunication systems, network architectures, and communication standards.

Figure 12:
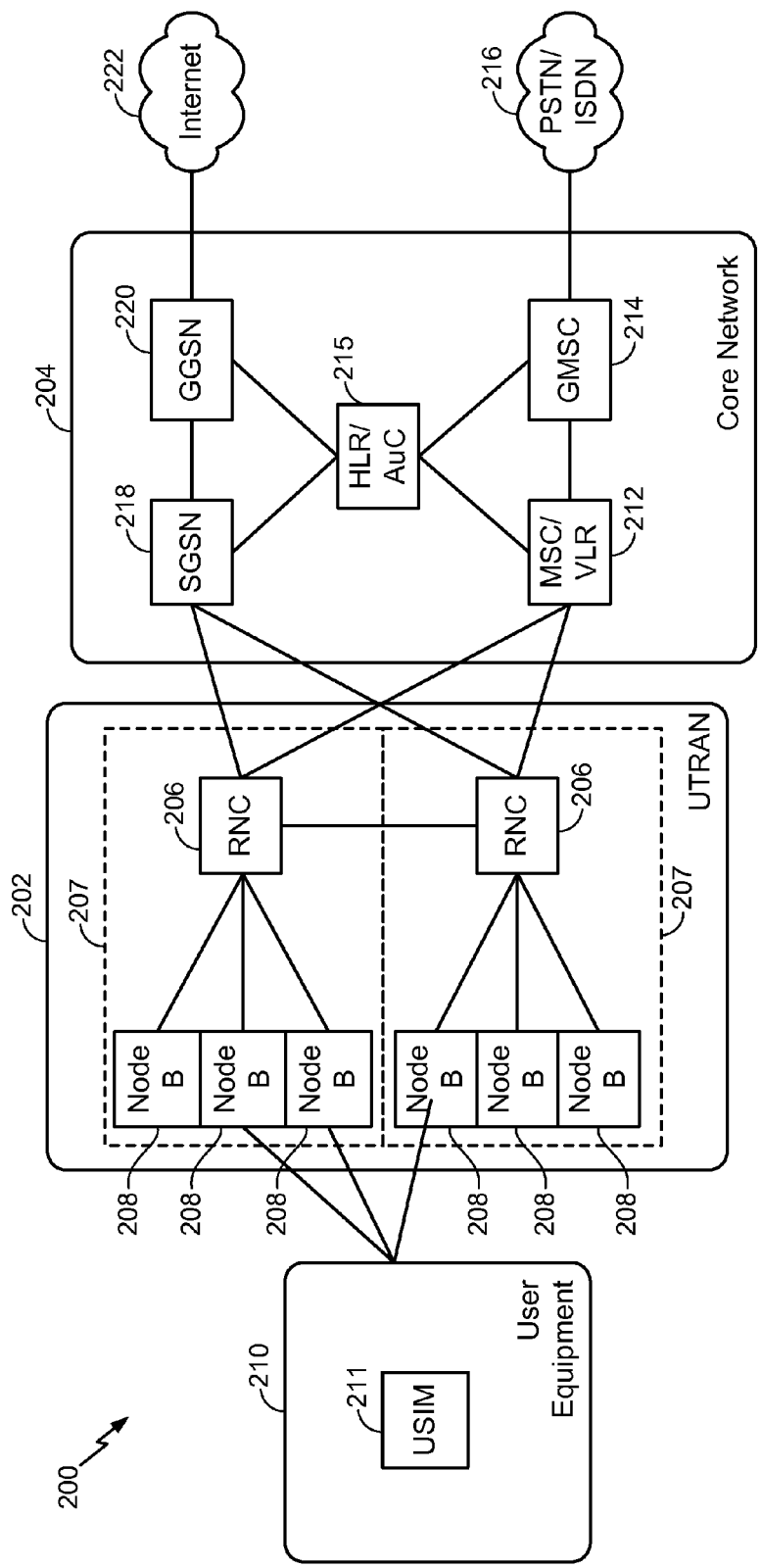
FIG. 12 is a block diagram conceptually illustrating an example of a telecommunications system including a user equipment configured to perform the functions described herein.

Referring to FIG. 12, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be configured to include, for example, wireless device 10 (FIGS. 1-2, and 6) and/or cell monitoring component 12 (FIGS. 1 and 6) as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL). HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 13:
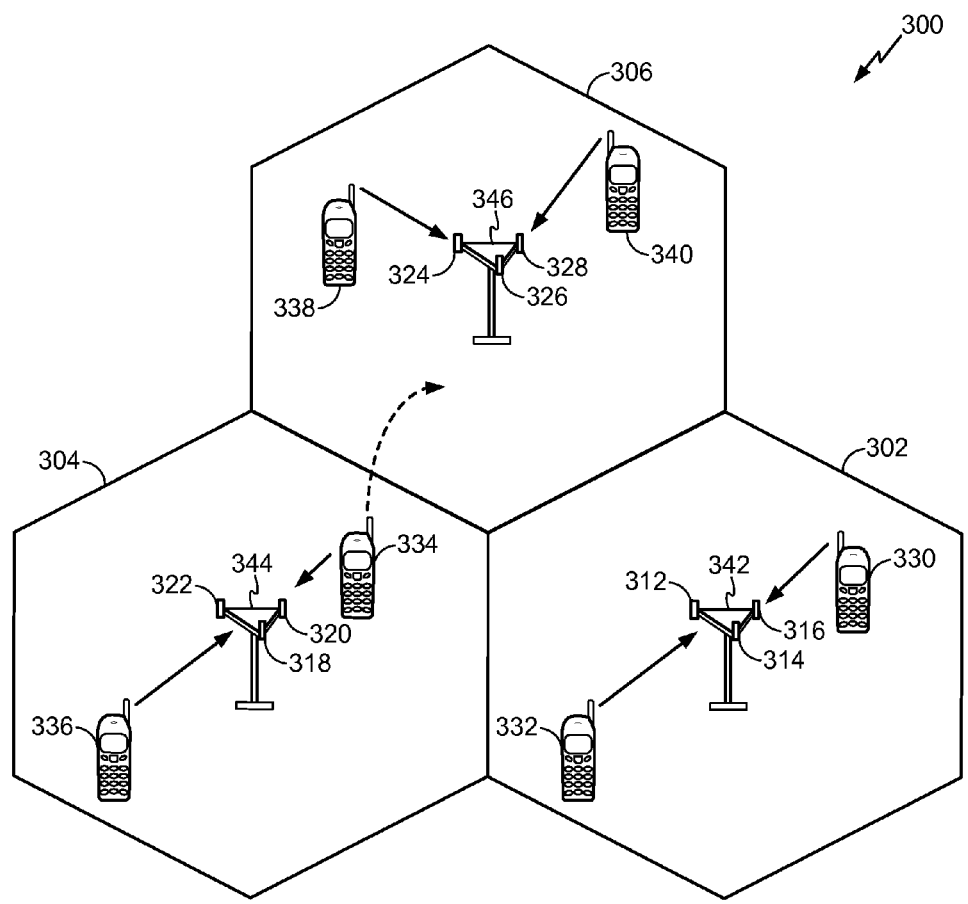
FIG. 13 is a conceptual diagram illustrating an example of an access network for use with user equipment configured to perform the functions described herein.

Referring to FIG. 13, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see earlier figure) for all the UEs 330, 332, 334, 336, 338, 340 in the respective cells 302, 304, and 306. UEs 330, 332, 334, 336, 338, 340 may be configured to include, for example, wireless device 10 (FIG. 1) and/or cell monitoring component 12 (FIG. 1) as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see earlier figure), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 14.

Figure 14:
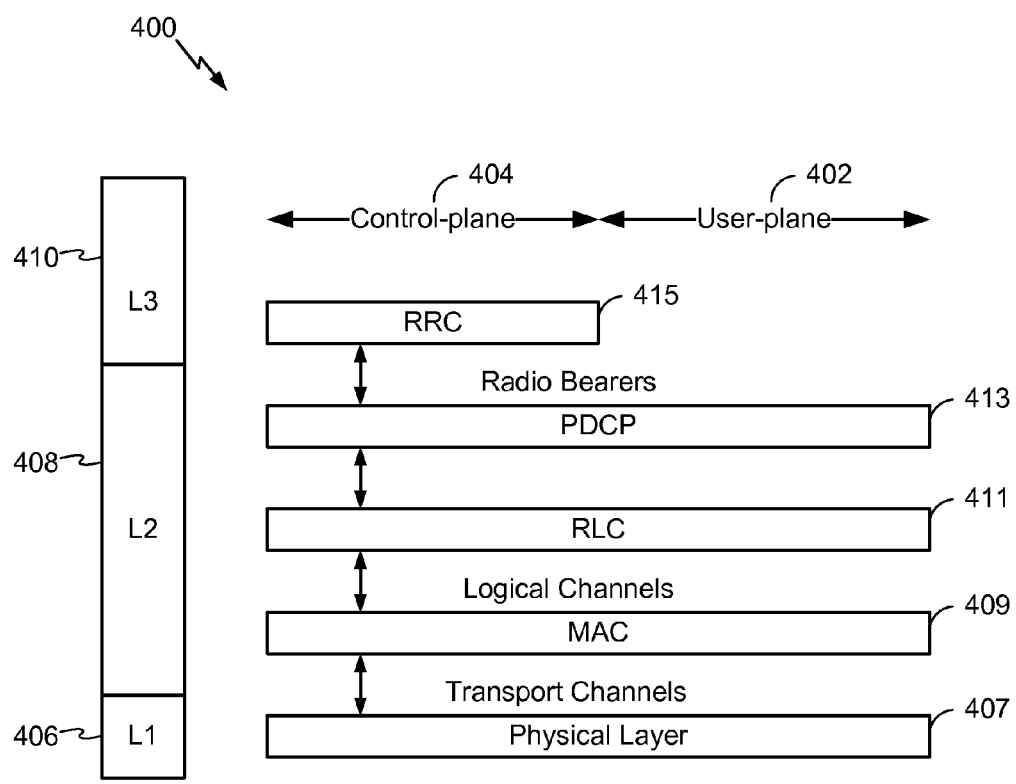
FIG. 14 is a conceptual diagram illustrating an example of a radio protocol architecture for the user and control planes for a base station and/or a user equipment configured to perform the functions described herein.

FIG. 14 is a conceptual diagram illustrating an example of the radio protocol architecture 400 for the user plane 402 and the control plane 404 of a user equipment (UE) or node B/base station. For example, architecture 400 may be included in a UE such as wireless device 10 (FIG. 1 or FIG. 2). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 15:
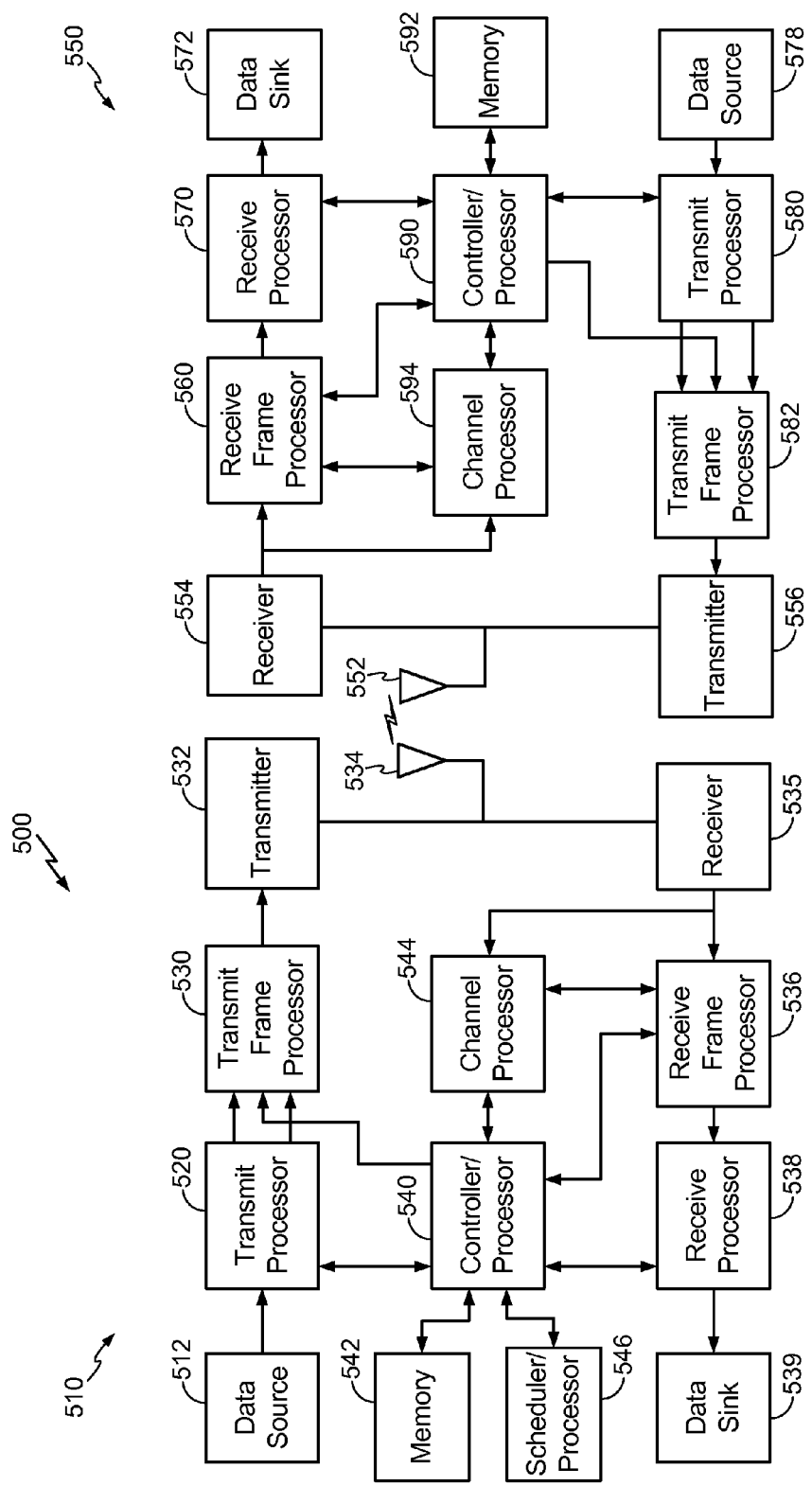
FIG. 15 is a block diagram conceptually illustrating an example of a telecommunications system including a Node B in communication with a user equipment configured to perform the functions described herein.

FIG. 15 is a block diagram of a communication system 500 including a Node B 510 in communication with a UE 550, where the UE 550 may be wireless device 10 in FIGS. 1-2, and 6. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 11) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106 (FIG. 11). The computer-readable medium 106 (FIG. 11) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of measurement in a wireless communication system, comprising:
   operating a wireless device on a first wireless communication technology;
   identifying a group of frequencies of a second wireless communication technology to be searched for cell reselection, wherein the second wireless communication technology is preferred relative to the first wireless communication technology;
   detecting a cell on one of the group of frequencies of the second wireless communication technology;
   determining that the detected cell of the second wireless communication technology satisfies a first reselection criterion based on a first measurement;
   scheduling a plurality of new measurements for the group of frequencies of the second wireless communication technology using a fast measurement periodicity mode in response to the detected cell of the second wireless communication technology satisfying the first reselection criterion, wherein the fast measurement periodicity mode includes increasing a frequency of measuring the group of frequencies of the second wireless communication technology so that the plurality of new measurements on each frequency of the group of frequencies occurs prior to an expiration of a reselection time period; and
   reselecting to a new cell on one of the group of frequencies of the second wireless communication technology when the new measurements corresponding to the new cell on one of the group of frequencies satisfy a second reselection criterion and the second reselection criterion is satisfied over the reselection time period, wherein satisfying the second reselection criterion over the reselection time period includes observing consecutive measurements corresponding to the new cell on one of the group of frequencies using the fast measurement periodicity.

2. The method of claim 1, wherein using the fast measurement periodicity mode includes reducing a measurement periodicity of the group of frequencies of the second wireless communication technology.

3. The method of claim 2, wherein reducing the measurement periodicity further includes changing from a normal measurement periodicity mode to fast measurement periodicity mode, wherein measurements according to the fast measurement periodicity mode occur at least twice as fast as measurements according to the normal measurement periodicity mode.

4. The method of claim 2, wherein reducing the measurement periodicity further includes additionally reducing the measurement periodicity based on a function of a number of the group of frequencies.

5. The method of claim 2, further comprising:
   measuring the detected cell of the second wireless communication technology according to the reduced measurement periodicity;
   determining that the measurement of the detected cell during the reduced measurement periodicity satisfies the second reselection criterion for the reselection time period; and
   reselecting from the first wireless communication technology to the detected cell of the second wireless communication technology after expiration of the reselection time period.

6. The method of claim 1, wherein detecting the cell of the second wireless communication technology includes detecting the cell operating on a frequency associated with Long Term Evolution (LTE) technology.

7. The method of claim 1, wherein operating on the first wireless communication technology includes operating on a Wideband Code Division Multiple Access (WCDMA) technology.

8. The method of claim 1, further comprising determining the second wireless communication technology is preferred over the first wireless communication technology based on a preference scheme.

9. The method of claim 1, further comprising:
reselecting from the first wireless communication technology to the detected cell of the second wireless communication technology after expiration of the reselection time period;
operating the wireless device on the second wireless communication technology;
wherein determining that the detected cell satisfies the first reselection criterion further comprises determining the first measurement meets a first threshold; and
determining that the plurality of new measurements meet a second threshold.

10. The method of claim 1, wherein scheduling the plurality of new measurements for the group of frequencies of the second wireless communication technology using the fast measurement periodicity mode further includes scheduling the plurality of new measurements for a high priority mode, wherein the high priority mode includes ensuring that a measured power level of the detected cell satisfies a power threshold during the reselection time period.

11. The method of claim 1, further comprising scheduling the plurality of new measurements for the group of frequencies of the second wireless communication technology using a normal measurement periodicity mode in response to failing to observe any cell on one of the group of frequencies that satisfies the first reselection criterion using the fast measurement periodicity mode.

12. The method of claim 1, wherein reselecting to the new cell on one of the group of frequencies of the second wireless communication technology further includes:
maintaining a preference scheme including a prioritized list of wireless communication technology identifiers, wherein an ordering of the wireless communication technology identifiers in the prioritized list corresponds to a preference of one wireless communication technology relative to another wireless communication technology; and
choosing the second wireless technology when the ordering of a second wireless technology identifier indicates a higher priority relative to a first wireless technology identifier.

13. An apparatus for wireless communication, comprising:
at least one processor; and
a memory coupled to the at least one processor, wherein the at least one processor is configured to:
operate a wireless device on a first wireless communication technology;
identifying a group of frequencies of a second wireless communication technology to be searched for cell reselection, wherein the second wireless communication technology is preferred relative to the first wireless communication technology;
detect a cell on one of the group of frequencies of the second wireless communication technology;
determine that the detected cell of the second wireless communication technology satisfies a first reselection criterion based on a first measurement;
schedule a plurality of new measurements for the group of frequencies of the second wireless communication technology using a fast measurement periodicity mode in response to the detected cell of the second wireless communication technology satisfying the first reselection criterion, wherein the fast measurement periodicity mode includes increasing a frequency of measuring the group of frequencies of the second wireless communication technology so that the plurality of new measurements on each frequency of the group of frequencies occurs prior to an expiration of a reselection time period; and
reselect to a new cell on one of the group of frequencies of the second wireless communication technology when the new measurements corresponding to the new cell on one of the group of frequencies satisfy a second reselection criterion and the second reselection criterion is satisfied over the reselection time period, wherein satisfying the second reselection criterion over the reselection time period includes observing consecutive measurements corresponding to the new cell on one of the group of frequencies using the fast measurement periodicity.

14. The apparatus of claim 13, wherein using the fast measurement periodicity mode includes reducing a measurement periodicity of the group of frequencies of the second wireless communication technology.

15. The apparatus of claim 14, wherein the at least one processor configured to reduce the measurement periodicity is further configured to change from a normal measurement periodicity mode to the fast measurement periodicity mode, wherein measurements according to the fast measurement periodicity mode occur at least twice as fast as measurements according to the normal measurement periodicity mode.

16. The apparatus of claim 14, wherein the at least one processor configured to reduce the measurement periodicity is further configured to additionally reduce the measurement periodicity based on a function of a number of the detected group of frequencies.

17. The apparatus of claim 14, further comprising:
the at least one processor further configured to:
measure the detected cell of the second wireless communication technology according to the reduced measurement periodicity;
wherein the at least one processor is further configured to determine that the measurement of the detected cell during the reduced measurement periodicity satisfies the second reselection criterion for the reselection time period; and
reselect from the first wireless communication technology to the detected cell of the second wireless communication technology after expiration of the reselection time period.

18. The apparatus of claim 13, wherein the at least one processor configured to detect the cell of the second wireless communication technology is further configured to detect the cell operating on a frequency associated with LTE technology.

19. The apparatus of claim 13, wherein the at least one processor configured to operate on the first wireless communication technology is further configured to operate on a WCDMA technology.

20. The apparatus of claim 13, the at least one processor is configured to determine the second wireless communication technology is preferred over the first wireless communication technology based on referencing a technology preference scheme.

21. The apparatus of claim 13, further comprising:
the at least one processor further configured to:
reselect from the first wireless communication technology to the detected cell of the second wireless communication technology after expiration of the reselection time period;
operate the wireless device on the second wireless communication technology;
wherein the at least one processor configured to determine that the detected cell satisfies the first reselection criterion is further configured to determine the first measurement meets a first threshold, and
wherein the at least one processor is further configured to determine that the plurality of new measurements meet a second threshold.

22. The apparatus of claim 13, wherein the at least one processor configured to schedule the plurality of new measurements for the group of frequencies of the second wireless communication technology using the fast measurement periodicity mode is further configured to schedule the plurality of new measurements for a high priority mode, wherein the high priority mode includes ensuring that a measured power level of the detected cell satisfies a power threshold during the reselection time period.

23. The apparatus of claim 13, wherein the at least one processor is further configured to schedule the plurality of new measurements for the group of frequencies of the second wireless communication technology using a normal measurement periodicity mode in response to failing to observe any cell on one of the group of frequencies that satisfies the first reselection criterion using the fast measurement periodicity mode.

24. The apparatus of claim 13, wherein the at least one processor configured to reselect to the new cell on one of the group of frequencies of the second wireless communication technology is further configured to:
maintaining a preference scheme including a prioritized list of wireless communication technology identifiers, wherein an ordering of the wireless communication technology identifiers in the prioritized list corresponds to a preference of one wireless communication technology relative to another wireless communication technology; and
choosing the second wireless technology when the ordering of a second wireless technology identifier indicates a higher priority relative to a first wireless technology identifier.

25. An apparatus of measurement in a wireless communication system, comprising:
means for operating a wireless device on a first wireless communication technology;
means for identifying a group of frequencies of a second wireless communication technology to be searched for cell reselection, wherein the second wireless communication technology is preferred relative to the first wireless communication technology;
means for detecting a cell on one of the group of frequencies of the second wireless communication technology;
means for determining that the detected cell of the second wireless communication technology satisfies a first reselection criterion based on a first measurement;
means for scheduling a plurality of new measurements for the group of frequencies of the second wireless communication technology using a fast measurement periodicity mode in response to the detected cell of the second wireless communication technology satisfying the first reselection criterion, wherein the fast measurement periodicity mode includes increasing a frequency of measuring the group of frequencies of the second wireless communication technology so that the plurality of new measurements on each frequency of the group of frequencies occurs prior to an expiration of a reselection time period; and
means for reselecting to a new cell on one of the group of frequencies of the second wireless communication technology when the new measurements corresponding to the new cell on one of the group of frequencies satisfy a second reselection criterion and the second reselection criterion is satisfied over the reselection time period, wherein satisfying the second reselection criterion over the reselection time period includes observing consecutive measurements corresponding to the new cell on one of the group of frequencies using the fast measurement periodicity.

26. The apparatus of claim 25, wherein using the fast measurement periodicity mode includes means for reducing a measurement periodicity of the group of frequencies of the second wireless communication technology.

27. The apparatus of claim 26, wherein means for reducing the measurement periodicity further includes means for changing from a normal measurement periodicity mode to the fast measurement periodicity mode, wherein measurements according to the fast measurement periodicity mode occur at least twice as fast as measurements according to the normal measurement periodicity mode.

28. The apparatus of claim 26, wherein means for reducing the measurement periodicity further includes means for additionally reducing the measurement periodicity based on a function of a number of the group of frequencies.

29. The apparatus of claim 26, further comprising:
means for measuring the detected cell of the second wireless communication technology according to the reduced measurement periodicity;
means for determining that the measurement of the detected cell during the reduced measurement periodicity satisfies the second reselection criterion for the reselection time period; and
means for reselecting from the first wireless communication technology to the detected cell of the second wireless communication technology after expiration of the reselection time period.

30. The apparatus of claim 25, wherein means for detecting the cell of the second wireless communication technology includes means for detecting the cell operating on a frequency associated with LTE technology.

31. The apparatus of claim 25, wherein means for operating on the first wireless communication technology includes means for operating on a WCDMA technology.

32. The apparatus of claim 25, further comprising means for determining the second wireless communication technology is preferred over the first wireless communication technology based on referencing a technology preference scheme.

33. The apparatus of claim 25, further comprising:
means for reselecting from the first wireless communication technology to the detected cell of the second wireless communication technology after expiration of the reselection time period;
means for operating the wireless device on the second wireless communication technology,
wherein means for determining that the detected cell satisfies the first reselection criterion further includes means for determining the first measurement meets a first threshold; and
means for determining that the plurality of new measurements meet a second threshold.

34. A computer program product, comprising:
a computer-readable medium comprising code for:
operating a wireless device on a first wireless communication technology;
identifying a group of frequencies of a second wireless communication technology to be searched for cell reselection, wherein the second wireless communication technology is preferred relative to the first wireless communication technology;

detecting a cell on one of the group of frequencies of the second wireless communication technology;

determining that the detected cell of the second wireless communication technology satisfies a first reselection criterion based on a first measurement;

scheduling a plurality of new measurements for the group of frequencies of the second wireless communication technology using a fast measurement periodicity mode in response to the detected cell of the second wireless communication technology satisfying the first reselection criterion, wherein the fast measurement periodicity mode includes increasing a frequency of measuring the group of frequencies of the second wireless communication technology so that the plurality of new measurements on each frequency of the group of frequencies occurs prior to an expiration of a reselection time period; and reselecting to a new cell on one of the group of frequencies of the second wireless communication technology when the new measurements corresponding to the new cell on one of the group of frequencies satisfy a second reselection criterion and the second reselection criterion is satisfied over the reselection time period, wherein satisfying the second reselection criterion over the reselection time period includes observing consecutive measurements corresponding to the new cell on one of the group of frequencies using the fast measurement periodicity.

* * * * *